US011292879B2

United States Patent
Misiego Arpa et al.

(10) Patent No.: US 11,292,879 B2
(45) Date of Patent: Apr. 5, 2022

(54) METHODS FOR THE MANUFACTURE OF POLYETHERIMIDES AND POLYETHERIMIDES MADE BY THE METHOD

(71) Applicant: SABIC GLOBAL TECHNOLOGIES B.V., Bergen op Zoom (NL)

(72) Inventors: Carmen Rocio Misiego Arpa, Cartagena (ES); Edward Venema, Cartagena (ES); Bernabe Quevedo Sanchez, Cartagena (ES); Javier Nieves Remacha, Cartagena (ES); Juan J. Rodriguez Ordonez, Cartagena (ES)

(73) Assignee: SHPP GLOBAL TECHNOLOGIES B.V., Bergen op Zoom (NL)

( * ) Notice: Subject to any disclaimer, the term of this patent is extended or adjusted under 35 U.S.C. 154(b) by 312 days.

(21) Appl. No.: 16/469,568

(22) PCT Filed: Dec. 21, 2017

(86) PCT No.: PCT/IB2017/058308
§ 371 (c)(1),
(2) Date: Jun. 13, 2019

(87) PCT Pub. No.: WO2018/122705
PCT Pub. Date: Jul. 5, 2018

(65) Prior Publication Data
US 2020/0079908 A1  Mar. 12, 2020

(30) Foreign Application Priority Data
Dec. 31, 2016  (EP) .................................. 16382679

(51) Int. Cl.
*C08G 73/10*  (2006.01)
(52) U.S. Cl.
CPC ..... *C08G 73/1046* (2013.01); *C08G 73/1053* (2013.01)
(58) Field of Classification Search
CPC .................. C08G 73/1046; C08G 73/1053
See application file for complete search history.

(56) References Cited

U.S. PATENT DOCUMENTS

| 5,229,482 A | 7/1993 | Brunelle |
| 6,417,255 B1 | 7/2002 | Penning et al. |

(Continued)

FOREIGN PATENT DOCUMENTS

| CN | 104448730 A | * | 3/2015 |
| EP | 2644640 A1 |   | 10/2013 |

(Continued)

OTHER PUBLICATIONS

International Search Report; International Application No. PCT/IB2017/058308; International Filing Date—Dec. 21, 2017; dated Apr. 17, 2018; 5 pages.

(Continued)

*Primary Examiner* — James C Goloboy
(74) *Attorney, Agent, or Firm* — Cantor Colburn LLP

(57) ABSTRACT

A method of manufacturing an isolated polyetherimide composition includes combining an as-synthesized polyetherimide comprising units of the formula (I) and a melt-stabilizing amount of a tri($C_{8-30}$ acyl) glyceride, an anhydride of the formula (II), or a combination comprising at least one of the foregoing, to provide a mixture; and isolating a polyetherimide composition from the mixture to provide the isolated polyetherimide composition having a change in complex viscosity measured over 30 minutes at 390° C., at a shear rate of 6.28 rad/seconds, strain=5%, and under nitrogen, from +15 to −20%, preferably from +10 to −20%, more preferably from +5 to −20%.

(I)

(Continued)

-continued

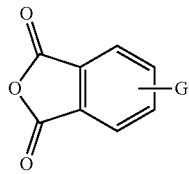

(II)

20 Claims, 3 Drawing Sheets

(56) References Cited

U.S. PATENT DOCUMENTS

| | | | |
|---|---|---|---|
| 8,357,773 B1 * | 1/2013 | Gallucci | C08G 73/1064 |
| | | | 528/480 |
| 9,006,319 B2 * | 4/2015 | Gallucci | C08L 69/00 |
| | | | 524/115 |
| 2013/0108851 A1 | 5/2013 | Kuhlman et al. | |
| 2018/0215897 A1 | 8/2018 | Venema et al. | |

FOREIGN PATENT DOCUMENTS

| | | | | |
|---|---|---|---|---|
| WO | 2017017638 A1 | | 2/2017 | |
| WO | WO-2017017638 A1 * | | 2/2017 | C08G 73/1003 |

OTHER PUBLICATIONS

Written Opinion; International Application No. PCT/IB2017/058308; International Filing Date—Dec. 21, 2017; dated Apr. 17, 2018; 7 pages.

* cited by examiner

METHODS FOR THE MANUFACTURE OF POLYETHERIMIDES AND POLYETHERIMIDES MADE BY THE METHOD

CROSS REFERENCE TO RELATED APPLICATIONS

This application is a National Stage application of PCT/IB2017/058308, filed Dec. 21, 2017, which claims the benefit of European Patent Application No. 16382679.5, filed Dec. 31, 2016, the entire contents of which are incorporated by reference herein.

BACKGROUND

This disclosure relates to methods for the manufacture of poly(etherimide)s, in particular methods for the manufacture of poly(etherimides) having improved thermal resistance.

Poly(etherimide)s (PEI) are amorphous, transparent, high performance polymers having a glass transition temperature ($T_g$) of greater than 180° C. Poly(etherimide)s further have high strength, toughness, heat resistance, and modulus, and broad chemical resistance, and so are widely used in industries as diverse as automotive, telecommunication, aerospace, electrical/electronics, transportation, and healthcare. Poly(etherimide)s have shown versatility in various manufacturing processes, proving amenable to techniques including injection molding, extrusion, and thermoforming, to prepare various articles.

Polyetherimides can be manufactured by different processes, as described, for example, in U.S. Pat. No. 9,006,319. In one process referred to herein for convenience as the "polycondensation process," a functionalized N-alkylphthalimide is condensed with an alkali metal salt of an aromatic dihydroxy compound to form a bisimide, which is subsequently converted to a dianhydride. The dianhydride is then polymerized by reaction with an organic diamine under imidization conditions to form the polyetherimides. Alternatively, in a process referred to herein as the "ether-forming polymerization" process, a nitro- or halo-substituted anhydride is reacted with a diamine to provide a bis(phthalimide), which is then polymerized in the presence of alkali metal salt of an aromatic dihydroxy compound to form the polyetherimides.

Surprisingly, it has been found that although the two processes produce polymers having the same units and molecular weights, the polyetherimides produced by the polycondensation process can have better melt stability than those produced by the ether-forming polymerization process. In particular, the polyetherimides produced by the polycondensation process can have less thermal degradation after being heated above its melting temperature for long periods of time, compared to the same polyetherimides produced by the ether-forming polymerization process. Thermal degradation of polyetherimides can occur both in manufacturing plant extruders and in molding machines and can result into generation of black specks that can foul extruder melt filters, or result in part defects due to deposits or splay. Such thermal degradation can be accelerated if moisture or air is present.

Various approaches have been used to improve the melt stability of polyetherimides. For example, control of polymerization stoichiometry can provide polyetherimides having fewer reactive endgroups, but in some instances, a trade-off between melt stability and yellowness index (YI) was observed. There remains a need in the art for methods for the manufacture of polyetherimides having improved melt stability, in particular less thermal degradation after being heated above the melting temperature of the polyetherimides. It would be a further advantage if the methods did not significantly adversely affect the optical properties of the polyetherimides.

SUMMARY

A method of manufacturing an isolated polyetherimide composition includes combining an as-synthesized polyetherimide comprising units of the formula

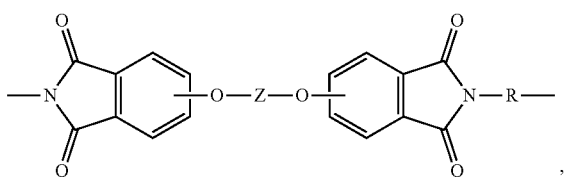

and a melt-stabilizing amount of a tri($C_{8-30}$ acyl) glyceride, an anhydride of the formula

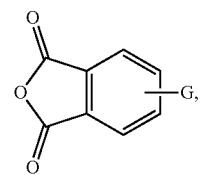

or a combination comprising at least one of the foregoing, wherein in the foregoing formulas, R is a substituted or unsubstituted $C_{6-30}$ aromatic hydrocarbon group, a substituted or unsubstituted, straight or branched chain $C_{4-30}$ alkylene group, a substituted or unsubstituted $C_{3-8}$ cycloalkylene group, or a combination comprising at least one of the foregoing; Z is an aromatic $C_{6-24}$ monocyclic or polycyclic group optionally substituted with 1 to 6 $C_{1-8}$ alkyl groups, 1 to 8 halogen atoms, or a combination comprising at least one of the foregoing, and G is a hydrogen atom, a halogen atom, a nitro group, $C_{1-12}$ alkyl, $C_{2-12}$ alkenyl, $C_{2-12}$ alkynyl, $C_{1-12}$ haloalkyl, $C_{1-12}$ alkoxy, $C_{1-12}$ haloalkoxy, $C_{3-12}$ cycloalkyl, $C_{5-12}$ cycloalkenyl, $C_{6-18}$ aryl, $C_{7-31}$ arylalkylene, $C_{7-31}$ alkylarylene, $C_{4-12}$ heterocycloalkyl, $C_{3-18}$ heteroaryl, $C_{1-12}$ alkyl sulfonyl, $C_{6-12}$ arylsulfonyl, tosyl, or a group of the formulas

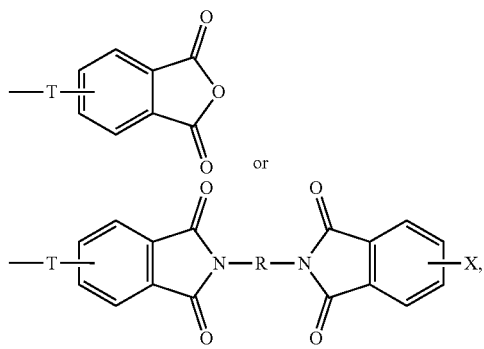

wherein T is —O—Z—O—, a single bond, —O—, —S—, —C(O)—, —SO$_2$—, —SO—, —P(R$^a$)(=O)— wherein R$^a$ is a C$_{1-8}$ alkyl or C$_{6-12}$ aryl, NR$^b$ wherein R$^b$ is a hydrogen atom, C$_{1-8}$ alkyl, or C$_{6-12}$ aryl, or T is a C$_{1-18}$ organic bridging group, and X is chloro, bromo, iodo, or nitro, or a combination comprising at least one of the foregoing, to provide a mixture; and isolating a polyetherimide composition from the mixture to provide the isolated polyetherimide composition having a change in complex viscosity measured over 30 minutes at 390° C., at a shear rate of 6.28 rad/seconds, strain=5%, and under nitrogen, from +15 to −20%, preferably from +10 to −20%, more preferably from +5 to −20%; and 0 to 3,000 parts per million, preferably 0 to 1,000 ppm, more preferably 0 to 300 ppm, each based on a total weight of the isolated polyetherimide composition, of a dianhydride of the formula

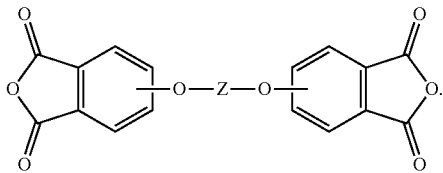

An isolated polyetherimide composition made by the foregoing method is also described.

An isolated polyetherimide composition comprises the polyetherimide and the tri(C$_{8-30}$ acyl) glyceride, an anhydride of the formula

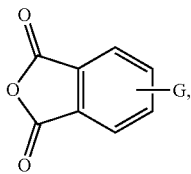

a combination comprising at least one of the foregoing, or a residue of the forgoing.

Also described is an article including the isolated polyetherimide composition made by the above-described method and the isolated polyetherimide composition, preferably an injection molded article.

The above described and other features are exemplified by the following Drawings and Detailed Description.

BRIEF DESCRIPTION OF THE DRAWINGS

A description of the figures, which are meant to be exemplary and not limiting, is provided.

Figure 1:
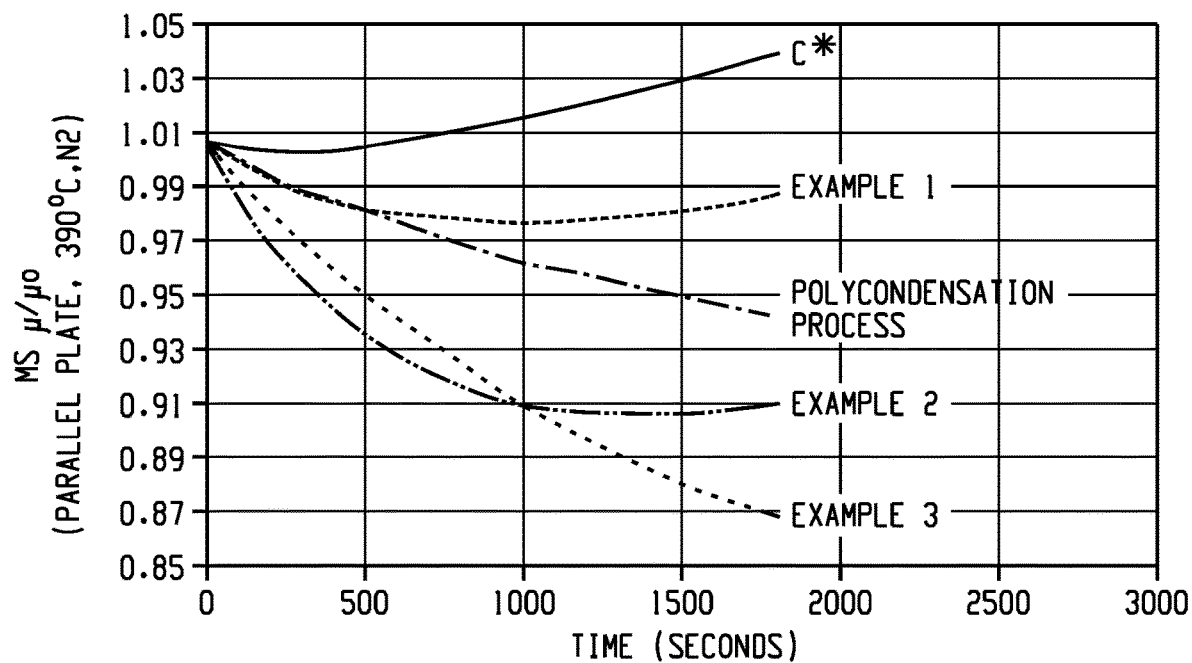
FIG. 1 is a graph of melt stability (MS) versus time (seconds (s)) showing polycondensation-derived PEI, C*, Example 1, Example 2, and Example 3.

The above described and other features are exemplified by the following detailed description and Examples.

DETAILED DESCRIPTION

The present inventors have discovered a process to control polyetherimide melt stability during the manufacturing process, by addition of certain acyl glycerides or anhydrides before polymer isolation. This process has a number of advantages. Melt stability is improved without significantly affecting optical properties such as YI. No post-compounding is needed. It can also improve plant capacity by improving melt filter lifetime. The improved melt stability can further lead to improvement in surface quality of high gloss articles.

In the process, a polyetherimide is manufactured by either a polycondensation or an ether-forming polymerization process to provide an as-synthesized PEI. Before the PEI is isolated from the polymerization mixture (e.g., by extrusion), certain anhydrides or acyl glycerides are added, followed by isolation to obtain an isolated polyetherimide composition. The polyetherimides, their manufacture, and the acyl glycerides and anhydrides are as follows.

The polyetherimides comprise more than 1, for example 2 to 1,000, or 5 to 500, preferably 5 to 100 or 10 to 100 structural units of formula (1)

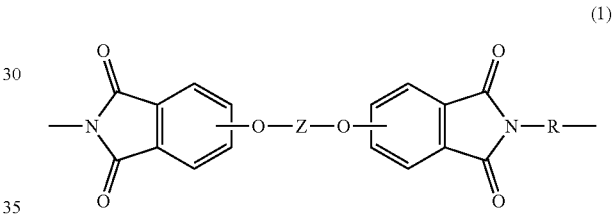

wherein each R is independently the same or different, and is a substituted or unsubstituted divalent organic group, such as a substituted or unsubstituted C$_{6-30}$ aromatic hydrocarbon group, a substituted or unsubstituted straight or branched chain C$_{4-30}$ alkylene group, a substituted or unsubstituted C$_{3-8}$ cycloalkylene group, in particular a halogenated derivative of any of the foregoing. In some embodiments, R is divalent group of one or more of the following formulas (2)

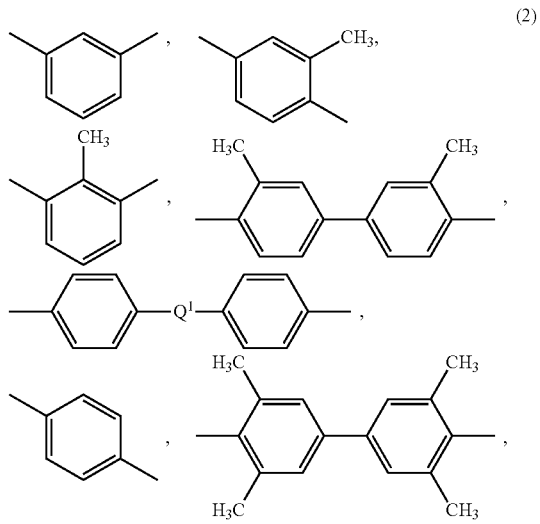

-continued

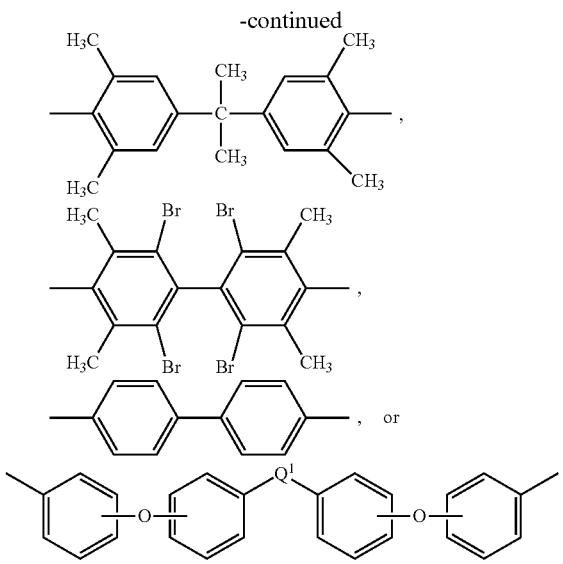

wherein $Q^1$ is —O—, —S—, —C(O)—, —SO$_2$—, —SO—, —P(R$^a$)(=O)— wherein R$^a$ is a C$_{1-8}$ alkyl or C$_{6-12}$ aryl, —C$_y$H$_{2y}$— wherein y is an integer from 1 to 5 or a halogenated derivative thereof (which includes perfluoroalkylene groups), or —(C$_6$H$_{10}$)$_z$— wherein z is an integer from 1 to 4. In some embodiments R is m-phenylene, p-phenylene, or a diarylene sulfone, in particular bis(4,4'-phenylene)sulfone, bis(3,4'-phenylene)sulfone, bis(3,3'-phenylene)sulfone, or a combination comprising at least one of the foregoing. In some embodiments, at least 10 mole percent or at least 50 mole percent of the R groups contain sulfone groups, and in other embodiments, no R groups contain sulfone groups.

Further in formula (1), the divalent bonds of the —O—Z—O— group are in the 3,3', 3,4', 4,3', or the 4,4' positions, and Z is an aromatic C$_{6-30}$ monocyclic or polycyclic moiety optionally substituted with 1 to 6 C$_{1-8}$ alkyl groups, 1 to 8 halogen atoms, or a combination comprising at least one of the foregoing, provided that the valence of Z is not exceeded. Exemplary groups Z include groups of formula (3)

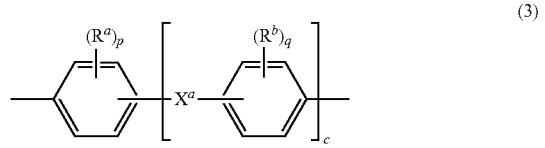

wherein R$^a$ and R$^b$ are each independently the same or different, and are a halogen atom or a monovalent C$_{1-6}$ alkyl group, for example; p and q are each independently integers of 0 to 4; c is 0 to 4; and X$^a$ is a bridging group connecting the hydroxy-substituted aromatic groups, where the bridging group and the hydroxy substituent of each C$_6$ arylene group are disposed ortho, meta, or para (specifically para) to each other on the C$_6$ arylene group. The bridging group X$^a$ can be a single bond, —O—, —S—, —S(O)—, —S(O)$_2$—, —C(O)—, or a C$_{1-18}$ organic bridging group. The C$_{1-18}$ organic bridging group can be cyclic or acyclic, aromatic or non-aromatic, and can further comprise heteroatoms such as halogens, oxygen, nitrogen, sulfur, silicon, or phosphorous. The C$_{1-18}$ organic group can be disposed such that the C$_6$ arylene groups connected thereto are each connected to a common alkylidene carbon or to different carbons of the C$_{1-18}$ organic bridging group. A specific example of a group Z is a divalent group of formula (3a)

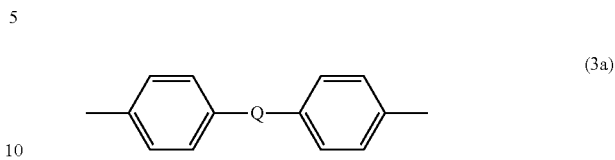

wherein Q is —O—, —S—, —C(O)—, —SO$_2$—, —SO—, —P(R$^a$)(=O)— wherein R$^a$ is a C$_{1-8}$ alkyl or C$_{6-12}$ aryl, or —C$_y$H$_{2y}$— wherein y is an integer from 1 to 5 or a halogenated derivative thereof (including a perfluoroalkylene group). In a specific embodiment Z is a derived from bisphenol A, such that Q in formula (3a) is 2,2-isopropylidene.

In an embodiment in formula (1), R is m-phenylene, p-phenylene, or a combination comprising at least one of the foregoing, and Z is a divalent group of formula (3a). Alternatively, R is m-phenylene, p-phenylene, or a combination comprising at least one of the foregoing, and Z is a divalent group of formula (3a) and Q is 2,2-isopropylidene. Alternatively, the polyetherimide can be a copolymer comprising additional structural polyetherimide units of formula (1) wherein at least 50 mole percent (mol %) of the R groups are bis(4,4'-phenylene)sulfone, bis(3,4'-phenylene)sulfone, bis(3,3'-phenylene)sulfone, or a combination comprising at least one of the foregoing, and the remaining R groups are p-phenylene, m-phenylene or a combination comprising at least one of the foregoing; and Z is 2,2-(4-phenylene) isopropylidene, i.e., a bisphenol A moiety.

The polyetherimide can be prepared by the methods known to those skilled in the art, including the "polycondensation" process and "ether-forming polymerization" process. Particular advantages are observed with the ether-forming polymerization process. In general in this process, an anhydride of formula (4) is reacted with an organic diamine of formula (5)

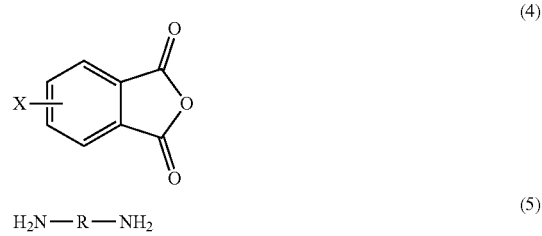

to provide a bis(phthalimide) of formula (6)

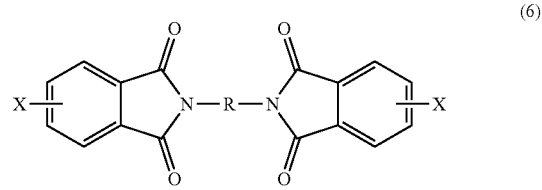

wherein in formulas (4), (5), and (6), R is as described above in formula (1) and X is a nitro group or a halogen, preferably chloro.

Examples of organic diamine (5) include 1,4-butanediamine, 1,5-pentanediamine, 1,6-hexanediamine, 1,7-heptanediamine, 1,8-octanediamine, 1,9-nonanediamine, 1,10-decanediamine, 1,12-dodecanediamine, 1,18-octadecanediamine, 3-methylheptamethylenediamine, 4,4'-dimethylheptamethylenediamine, 4-methylnonamethylenediamine, 5-methylnonamethylenediamine, 2,5-dimethylhexamethylenediamine, 2,5-dimethylheptamethylenediamine, 2,2-dimethylpropylenediamine, N-methyl-bis (3-aminopropyl) amine, 3-methoxyhexamethylenediamine, 1,2-bis(3-aminopropoxy) ethane, bis(3-aminopropyl) sulfide, 1,4-cyclohexanediamine, bis-(4-aminocyclohexyl) methane, m-phenylenediamine, p-phenylenediamine, 2,4-diaminotoluene, 2,6-diaminotoluene, m-xylylenediamine, p-xylylenediamine, 2-methyl-4,6-diethyl-1,3-phenylene-diamine, 5-methyl-4,6-diethyl-1,3-phenylene-diamine, benzidine, 3,3'-dimethylbenzidine, 3,3'-dimethoxybenzidine, 1,5-diaminonaphthalene, bis(4-aminophenyl) methane, bis(2-chloro-4-amino-3,5-diethylphenyl) methane, bis(4-aminophenyl) propane, 2,4-bis(p-amino-t-butyl) toluene, bis(p-amino-t-butylphenyl) ether, bis(p-methyl-o-aminophenyl) benzene, bis(p-methyl-o-aminopentyl) benzene, 1, 3-diamino-4-isopropylbenzene, bis(4-aminophenyl) sulfide, bis-(4-aminophenyl) sulfone (also known as 4,4'-diaminodiphenyl sulfone (DDS)), and bis(4-aminophenyl) ether. Any regioisomer of the foregoing compounds can be used. $C_{1-4}$ alkylated or poly($C_{1-4}$)alkylated derivatives of any of the foregoing can be used, for example a polymethylated 1,6-hexanediamine. Combinations of these compounds can also be used. In some embodiments, the organic diamine is m-phenylenediamine, p-phenylenediamine, 4,4'-diaminodiphenyl sulfone, 3,4'-diaminodiphenyl sulfone, 3,3'-diaminodiphenyl sulfone, or a combination comprising at least one of the foregoing.

The as-synthesized polyetherimide is formed by reacting the bis(phthalimide) (6) with a dihydroxy aromatic alkali metal salt of formula (7)

$$M^+{}^-O-Z-O^-{}^+M \qquad (7)$$

wherein M is an alkali metal, preferably sodium or potassium, and Z is as described above in formula (1). Reacting can be in the presence or absence of a phase transfer catalyst, to provide the polyetherimide. Suitable phase transfer catalysts and conditions are disclosed in U.S. Pat. No. 5,229,482.

It is also possible to obtain the as-synthesized polyetherimide from the "polycondensation" process. This process relies on the reaction of an aromatic di(ether anhydride) of formula (8) or a chemical equivalent thereof, with an organic diamine of formula (5)

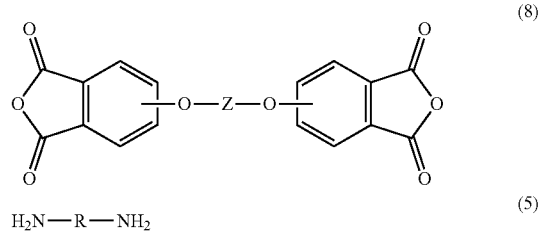

(8)

(5)

wherein Z and R are defined as described above in formula (1). Copolymers of the polyetherimides can be manufactured using a combination of an aromatic di(ether anhydride) of formula (8) and an additional di(anhydride) that is not a di(ether anhydride), for example pyromellitic dianhydride or bis(3,4-dicarboxyphenyl) sulfone dianhydride.

Exemplary organic diamines are described above.

Illustrative examples of aromatic di (ether anhydride)s (8) include 2,2-bis[4-(3,4-dicarboxyphenoxy)phenyl]propane dianhydride (also known as bisphenol A dianhydride or BPADA), 3,3-bis[4-(3,4-dicarboxyphenoxy)phenyl]propane dianhydride; 4,4'-bis(3,4-dicarboxyphenoxy)diphenyl ether dianhydride; 4,4'-bis(3,4-dicarboxyphenoxy)diphenyl sulfide dianhydride; 4,4'-bis(3,4-dicarboxyphenoxy)benzophenone dianhydride; 4,4'-bis(3,4-dicarboxyphenoxy)diphenyl sulfone dianhydride; 4,4'-bis(2,3-dicarboxyphenoxy)diphenyl ether dianhydride; 4,4'-bis(2,3-dicarboxyphenoxy)diphenyl sulfide dianhydride; 4,4'-bis(2,3-dicarboxyphenoxy) benzophenone dianhydride; 4,4'-bis(2,3-dicarboxyphenoxy) diphenyl sulfone dianhydride; 4-(2,3-dicarboxyphenoxy)-4'-(3,4-dicarboxyphenoxy)diphenyl-2,2-propane dianhydride; 4-(2,3-dicarboxyphenoxy)-4'-(3,4-dicarboxyphenoxy)diphenyl ether dianhydride; 4-(2,3-dicarboxyphenoxy)-4'-(3,4-dicarboxyphenoxy)diphenyl sulfide dianhydride; 4-(2,3-dicarboxyphenoxy)-4'-(3,4-dicarboxyphenoxy) benzophenone dianhydride; 4,4'-(hexafluoroisopropylidene) diphthalic anhydride; and 4-(2,3-dicarboxyphenoxy)-4'-(3, 4-dicarboxyphenoxy)diphenyl sulfone dianhydride. A combination of different aromatic di(ether anhydride)s can be used.

The as-synthesized polyetherimides can be isolated by various methods, including melt extrusion. Before isolation, a melt-stabilizing amount of a tri($C_{8-30}$ acyl) glyceride or an anhydride is added to the as-synthesized polyetherimide.

The tri($C_{8-30}$ acyl) glyceride is of formula (9)

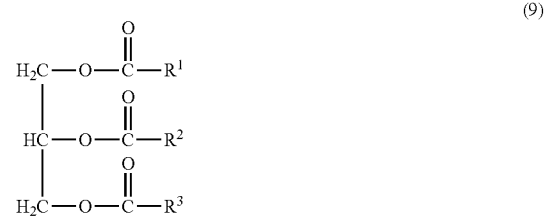

(9)

wherein each $R^1$, $R^2$, and $R^3$ is independently a substituted or unsubstituted $C_{8-30}$ alkyl group optionally having 0 to 6 unsaturations, or a $C_{8-20}$ alkyl group optionally having 0 to 6 unsaturations. In an embodiment, each $R^1$, $R^2$, and $R^3$ is independently a $C_{8-30}$ alkyl group with 1 to 2 unsaturations, and optionally substituted with one or more halogens, or a $C_{8-20}$ alkyl group with 1 to 2 unsaturations, and optionally substituted with one or more halogens. In some embodiments, each $R_1$, $R_2$, and $R_3$ is independently $C_{8-30}$ alkyl, $C_{8-30}$ haloalkyl, $C_{8-30}$ polyhaloalkyl, or $C_{8-30}$ alkene, or $C_{8-20}$ alkyl, $C_{8-20}$ haloalkyl, $C_{8-20}$ polyhaloalkyl, or $C_{8-20}$ alkene, or $C_{12-20}$ alkyl, $C_{12-20}$ haloalkyl, $C_{12-20}$ polyhaloalkyl, or $2_{12-30}$ alkene. In some embodiments, $R_1$, $R_2$, and $R_3$ are independently $C_{17}H_{35}$ and in some embodiments are all $C_{17}H_{35}$. Preferably, the tri($C_{8-30}$ acyl) glyceride comprises glycerol tristearate.

In an embodiment, the anhydride that can be added to the as-synthesized polyetherimide can be of formula (10)

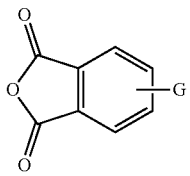
(10)

wherein G is a hydrogen atom, a halogen atom, a nitro group, $C_{1-12}$ alkyl, $C_{2-12}$ alkenyl, $C_{2-12}$ alkynyl, $C_{1-12}$ haloalkyl, $C_{1-12}$ alkoxy, $C_{1-12}$ haloalkoxy, $C_{3-12}$ cycloalkyl, $C_{5-12}$ cycloalkenyl, $C_{6-18}$ aryl, $C_{7-31}$ arylalkylene, $C_{7-31}$ alkylarylene, $C_{4-12}$ heterocycloalkyl, $C_{3-18}$ heteroaryl, $C_{1-12}$ alkyl sulfonyl, $C_{6-12}$ arylsulfonyl, or tosyl. In an embodiment, G is a hydrogen atom, a halogen atom, a nitro group, $C_{1-6}$ alkyl, $C_{2-6}$ alkenyl, $C_{2-6}$ alkynyl, $C_{1-6}$ haloalkyl, $C_{1-6}$ alkoxy, $C_{1-6}$ haloalkoxy, $C_{3-6}$ cycloalkyl, $C_{5-6}$ cycloalkenyl, $C_{6-12}$ aryl, $C_{13}$ arylalkylene, $C_{7-13}$ alkylarylene, $C_{4-6}$ heterocycloalkyl, $C_{3-12}$ heteroaryl, $C_{1-6}$ alkyl sulfonyl, $C_6$ arylsulfonyl, or tosyl.

In another embodiment, G can be a group of formula (11)

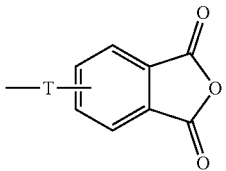
(11)

wherein the divalent bonds of the -T- group are in the 3,3', 3,4', 4,3', or the 4,4' positions. T can be a group of the formula —O—Z—O— as described in formula (1), a single bond, —O—, —S—, —C(O)—, —SO$_2$—, —SO—, —P(R$^a$)(=O)— wherein R$^a$ is $C_{1-8}$ alkyl or $C_{6-12}$ aryl, NR$^b$ wherein R$^b$ is a hydrogen atom, $C_{1-8}$ alkyl, or $C_{6-12}$ aryl, or T can be a $C_{1-18}$ organic bridging group. The $C_{1-18}$ organic bridging group can be cyclic or acyclic, aromatic or non-aromatic, and can further comprise heteroatoms such as halogens, oxygen, nitrogen, sulfur, silicon, or phosphorous. Exemplary $C_{1-18}$ organic bridging groups include $C_{1-12}$ alkylene groups such as —C$_d$H$_{2d}$— wherein d is an integer from 1 to 12 or a halogenated derivative thereof (including a perfluoroalkylene group), or $C_{6-12}$ arylene. It is also possible to use a combination of anhydrides with different groups G.

In a specific embodiment, G is a group of formula (11a)

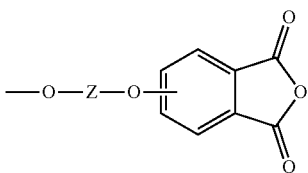
(11a)

wherein Z is as defined in formula (1). In an embodiment, Z in formula (11a) is not the same as the Z in the as-synthesized polyetherimide.

In still another specific embodiment, G is a group of formula (11b)

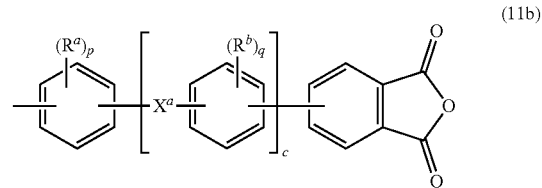
(11b)

wherein R$^a$, R$^b$, p, q, c, and X$^a$ are as defined in formula (3). In a specific embodiment, in formula (11b) p and q are each independently 0 or 1, R$^a$ and R$^b$ are methyl, and X$^a$ is a single bond, —O—, —S—, —S(O)—, —SO$_2$—, —C(O)—, or a $C_{1-6}$ organic bridging group. In some embodiments, the Z in formula (11b) is not the same as the Z in the as-synthesized polyetherimide.

In an embodiment, G can be a group of formula (12)

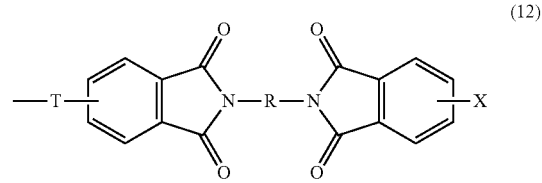
(12)

wherein T is as described in formula (11), and R and X are as described in formula (6). In a specific embodiment, G is of formula (12a)

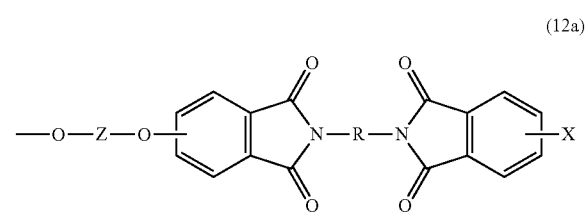
(12a)

wherein Z is as defined in formula (1), and R and X are as defined in formula (6). In a specific embodiment, Z is a group of formula (3) or a divalent group of formula (3a). In an embodiment, Z in formula (12a) is not the same as the Z in the as-synthesized polyetherimide.

Advantageously, the anhydrides are selected to have a structure that corresponds to the starting materials or intermediates of the process used to manufacture the as-synthesized polyetherimide. For example, the anhydride, when present, can be a monoanhydride of formula (10a)

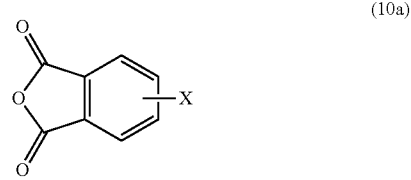
(10a)

wherein X is a hydrogen atom, halogen atom, or a nitro group, preferably a chlorine atom. In an embodiment, the monoanhydride is of formula (10b)

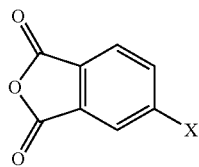

(10b)

wherein X is a halogen atom, specifically a chlorine atom, or a nitro group, and as in the as-synthesized polyetherimide. X in the as-synthesized polyetherimide is derived from the substituted anhydride used in the manufacture of the polyetherimides. In other embodiments, the anhydride can be a dianhydride of formula (10c)

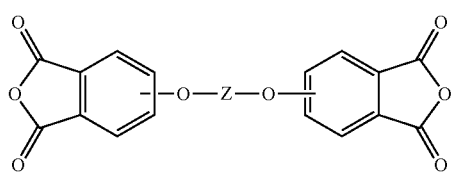

(10c)

wherein Z is as defined in formula (1), and is the same as Z in the as-synthesized polyetherimide. A specific example of this dianhydride is the dianhydride of formula (10c-1)

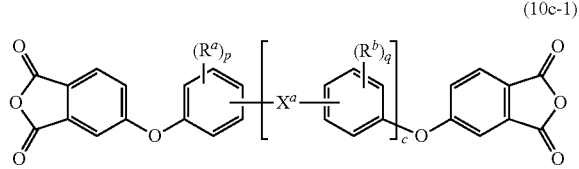

(10c-1)

wherein $R^a$, $R^b$, p, q, c, and $X^a$ in the dianhydride are the same as Z in the as-synthesized polyetherimide. Another specific example of the dianhydride of formula (10c) is a dianhydride of formula (10c-2)

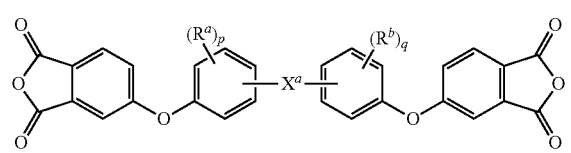

(10c-2)

wherein $R^a$, $R^b$, p, q, and $X^a$ in the dianhydride are the same as Z in the as-synthesized polyetherimide. When the polyetherimide is derived from bisphenol A, a still more specific example of the dianhydride (8) is a dianhydride of formula (10c-3)

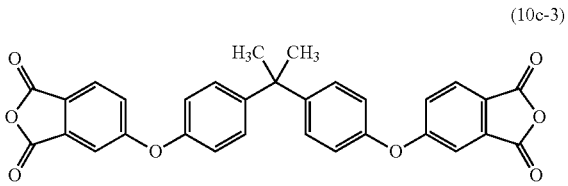 [SMILES: CC(C)(c1ccc(Oc2ccc3c(c2)C(=O)OC3=O)cc1)c1ccc(Oc2ccc3c(c2)C(=O)OC3=O)cc1]

(10c-3)

which is commonly known as bisphenol A dianhydride (BPADA).

Alternatively, or in addition, the anhydride can be an oligophthalimide of formula (10d)

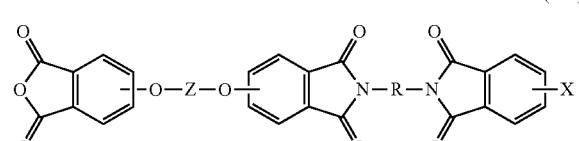

(10d)

wherein Z, R, and X are the same as in the as-synthesized polyetherimide. X is a halogen atom or a nitro group, and is derived from the nitro- or halo-substituted anhydride that is reacted with a diamine to provide a bis(phthalimide) used to manufacture the polyetherimide.

When R is derived from a meta-phenylene diamine, the anhydride can be an oligophthalimide of formula (10e)

(10e)

wherein Z and X are the same as Z in the as-synthesized polyetherimide. In a specific example of this embodiment, the anhydride is an oligophthalimide of formula (10e-1)

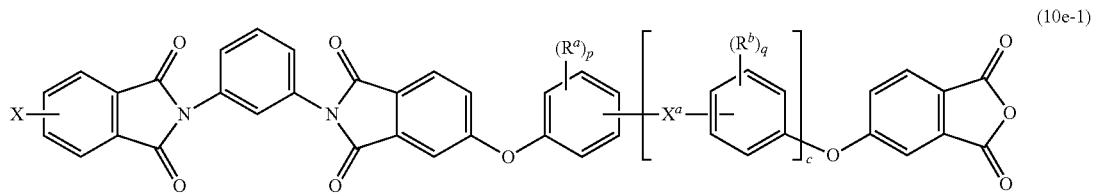

wherein $R^a$, $R^b$, p, q, c, and $X^a$ are the same as Z in the as-synthesized polyetherimide. Another specific example of the anhydride of formula (10e) is an anhydride of formula (10e-2)

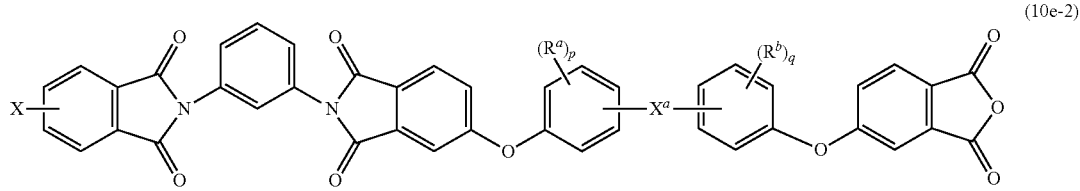

wherein $R^a$, $R^b$, p, q, $X^a$, and X are the same as Z in the as-synthesized polyetherimide. In another specific embodiment, when the as-synthesized polyetherimide is derived from bisphenol A and meta-phenylene diamine, the anhydride is an oligophthalimide is of formula (10e-3)

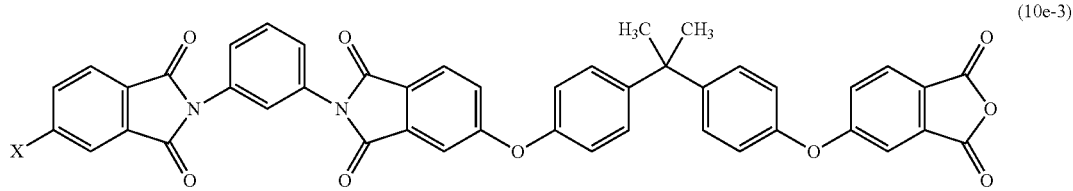

wherein X is the same as in the as-synthesized polyetherimide and Z is derived from bisphenol A in the as-synthesized polyetherimide.

As used herein, the term "Z is the same as in the as-synthesized polyetherimide" means the Z of the as-synthesized polyetherimide has a structure equivalent to that of the $R^a$, $R^b$, p, q, c, and $X^a$ in the dianhydride of any of formulas (10c), (10d), or (10e), including sub-formulas thereof.

In any of the foregoing embodiments, a combination of different anhydrides can be used. In an embodiment, the anhydride is dianhydride (10c-2). It is also possible to use the tri($C_{8-30}$ acyl) glyceride in combination with one or more of the anhydrides.

The tri($C_{8-30}$ acyl) glyceride, anhydride, or combination comprising at least one of the foregoing is present in a melt-stabilizing amount, for example an amount effective to provide 10 to 2,600 parts per million by weight (ppm) of anhydride equivalents based on the total weight of the as-synthesized polyetherimide. In other embodiments, the amount can be 10 to 1,600 ppm, 25 to 1,600 ppm, 50 to 1,600 ppm, 50 to 1,000 ppm, 50 to 750 ppm, 50 to 600 ppm, or 50 to 500 ppm of anhydride equivalents, or 50 to 250 ppm of anhydride equivalents, or 100 to 1500 ppm of anhydride equivalents, or 100 to 1,000 ppm of anhydride equivalents, each based on the total weight of the as-synthesized polyetherimide. As further illustrated below, "anhydride equivalents" are calculated based on the formula weight of an anhydride unit (—C(=O)—O—C(=O)—)=72 g/mol), the molecular weight of the tri($C_{8-30}$ acyl) glyceride or anhydride, and the number of moles of anhydride equivalents per molecule. It is assumed that since a tri($C_{8-30}$ acyl) glyceride contains 3 carboxyl groups (—COOH), it is equivalent to 3/2=1.5 moles of anhydride. For example, an addition of 192 ppm of BPADA (dianhydride, 520.49 g/mol) corresponds to 0.276 equivalents of anhydride groups, or 53 ppm of anhydride equivalents.

After combining (mixing) the tri($C_{8-30}$ acyl) glyceride, anhydride, or combination thereof, and the as-synthesized polyetherimide to provide a mixture, an isolated polyetherimide composition is obtained from the mixture to provide the isolated polyetherimide composition. For example, the mixture can be melt extruded to provide the isolated polyetherimide composition. The melt extruding can be 150 to 420° C., preferably 180 to 400° C., most preferably 180 to 370° C. After extrusion, the isolated polyetherimide composition can be cooled, and further processed, for example chopped into pellets. In another embodiment, the isolated polyetherimide composition can be obtained from the mixture using a mechanical evaporator such as a wiped film evaporator. In still another embodiment, a solvent can be separated from the mixture in a mixer, and heat and a vacuum can be applied to obtain the isolated polyetherimide composition.

The isolated polyetherimide composition can also have residual components from the manufacture of the polyetherimide. As used herein, a "residue" is one or more residual components from the manufacture of the polyetherimide. Some of these include a group of the formula HO—Z—OH wherein Z is as described in formula (1), e.g., bisphenol A (BPA); a nitro-or halo-substituted anhydride, e.g., 4-chlorophthalic anhydride (ClPA); a nitro-or halo-substituted bisimide, e.g., 1,3-bis(N-(4-chlorophthalimido))benzene (ClPAMI); a dianhydride, e.g., BPADA; a solvent used in the manufacture of the polyetherimide, e.g., o-dichlorobenzene; decomposition products, including substituted and unsubstituted compounds, such as acetophenone, phenylacetic acid, phenols, benzoic acid, phthalimides, phthalic anhydrides; any of the melt stabilizing additives or decomposition products thereof; or a combination comprising at least one of the foregoing. For example, the isolated polyetherimide composition can comprise any of these residual components individually in an amount of 0 to 5,000 ppm, 0 to 3,000 ppm, 0 to 2,000 ppm, 0 to 1,000 ppm, 0 to 500 ppm, 0 to 300 ppm, 0 to 250 ppm, 0 to 100 ppm, 0 to 50 ppm, 10 to 2,000 ppm, 10 to 1,000 ppm, 10 to 500 ppm, 10 to 250 ppm, 10 to 100 ppm, 10 to 50 ppm, 25 to 100 ppm, 25 to 150 ppm, 25 to 200 ppm, 25 to 250 ppm, 25 to 300 ppm, 25 to 400 ppm, 25 to 500 ppm, 25 to 1,000 ppm, 25 to 2,000 ppm, 50 to 2,000 ppm, 50 to 1,000 ppm, 50 to 250 pp, 50 to 100 ppm, 100 to 1,000 ppm, 100 to 500 ppm, 100 to 250 ppm, 100 to 150 ppm, 150 ppm to 1,000 ppm, 150 ppm to 500 ppm, or 150 ppm to 250 ppm.

The isolated polyetherimide composition can have 0 to 3,000 ppm, 0 to 1,000 ppm, or 0 to 300 ppm of a dianhydride of formula (8)

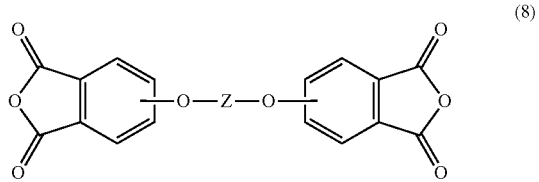
(8)

wherein Z is as described in formula 1, and can be the same or different as the polyetherimide. The isolated polyetherimide composition can have up to 3,000 ppm, up to 1,000 ppm, or up to 0 to 300 ppm of a dianhydride of formula (8). In an embodiment, the isolated polyetherimide composition comprises 0 to 3,000 ppm, 0 to 1,000 ppm, 0 to 500 ppm, 0 to 300 ppm, up to 3,000 ppm, up to 1,000 ppm, or up to 0 to 300 ppm of a dianhydride of formula (10c-3).

In another embodiment, the isolated polyetherimide composition comprises 0 to 5,000 ppm, preferably 0 to 1,000 ppm, more preferably 0 to 100 ppm of a bis(phthalimide) of the formula

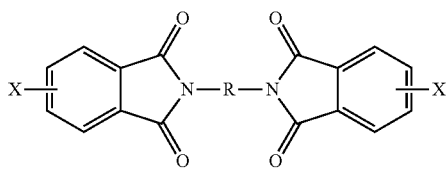
(6)

wherein R is as defined in formula (1), preferably 2,4-phenylene, and X hydrogen, a halogen, or nitro, preferably wherein X is chloro The isolated polyetherimide composition can retain some or all of the added tri($C_{8-30}$ acyl) glyceride, anhydride, or combination thereof. However, without being bound by theory, it is believed that the tri($C_{8-30}$ acyl) glyceride, anhydride, or combination thereof reacts during the isolation process to provide the melt-stabilization. It is possible that the tri($C_{8-30}$ acyl) glyceride, anhydride, or combination thereof is incorporated into the polyetherimide during isolation of the polyetherimide, for example as an endcap, as a crosslinker, or being incorporated into the polyetherimide backbone. It is also possible that the tri($C_{8-30}$ acyl) glyceride, anhydride, or combination thereof can be reacted with various impurities in the as-synthesized composition.

In an embodiment, the isolated polyetherimide composition comprises 0 to 80%, 0 to 70%, 0 to 60%, 0 to 50%, 0 to 40%, 0 to 30%, 0 to 20%, or 0 to 10% of the tri($C_{8-30}$ acyl) glyceride, anhydride, or combination thereof that was added to the as-synthesized polyetherimide prior to isolation of the polyetherimide composition. In other embodiments, the isolated polyetherimide composition comprises up to 80%, up to 70%, up to 60%, up to 50%, 0 to 40%, up to 30%, up to 20%, or up to 10% of the tri($C_{8-30}$ acyl) glyceride, anhydride, or combination thereof that was added to the as-synthesized polyetherimide. In still other embodiments, the isolated polyetherimide composition comprises 10 to 80%, 10 to 60%, 10 to 50%, 10 to 40%, or 10 to 30% of the tri($C_{8-30}$ acyl) glyceride, anhydride, or combination thereof that was added to the as-synthesized polyetherimide. Alternatively, the isolated polyetherimide composition comprises 20 to 80%, 20 to 60%, 20 to 50%, or 20 to 40%, of the tri($C_{8-30}$ acyl) glyceride, anhydride, or combination thereof that was added to the as-synthesized polyetherimide; or 30 to 80%, 30 to 60%, or 30 to 50% of the tri($C_{8-30}$ acyl) glyceride, anhydride, or combination thereof that was added to the as-synthesized polyetherimide.

The isolated polyetherimide compositions made by these methods can have a melt index of 0.1 to 10 grams per minute (g/min), as measured by American Society for Testing Materials (ASTM) D1238 at 340 to 370° C., using a 6.7 kilogram (kg) weight. The isolated polyetherimide composition can have a weight average molecular weight ($M_w$) of 10,000 to 100,000 grams/mole (g/mol), as measured by gel permeation chromatography, using polystyrene standards, or an $M_w$ of 2,000 to 80,000 g/mol. In specific embodiments, the isolated polyetherimide can have $M_w$ of 30,000 to 75,000 g/mol, or 35,000 to 56,000 g/mol, or 40,000 to 56,000 g/mol. Such polyetherimide compositions can have an intrinsic viscosity greater than 0.2 deciliters per gram (dL/g), or, more specifically, 0.35 to 0.7 dL/g as measured in m-cresol at 25° C.

The isolated polyetherimide compositions made by the foregoing methods can further have a number of advantageous properties, including good melt stability (e.g., low thermal degradation in the melt), and good optical properties.

A method to quantify melt stability of the isolated polyetherimide composition can be by measuring a change in complex viscosity over time at constant temperature and shear rate. In an embodiment, the change in complex viscosity over 30 minutes at 390° C. and a shear rate of 6.28 radians per second (rad/s), strain=5%, under nitrogen, varies from 0 to −20%, or from −1 to −20%, or from −5 to −20%, or from −10 to −20%. In other embodiments, the change in complex viscosity over 30 minutes at 390° C. and a shear rate of 6.28 rad/s, strain=5%, under nitrogen, varies from +15 to −20%, or +10 to −20%, or +5 to −20%. The improvements in melt stability can lead to improvements in manufacturing, for example increased extruder melt filter lifetime.

In another advantageous feature, the isolated polyetherimide composition can have a yellowness index of less than 150, preferably less than 140, determined in accordance with ASTM D1925-00 on a molded sample having a thickness of 3.2 mm.

The isolated polyetherimide composition can be formed into articles by any number of methods, for example, shaping, extruding (including profile extrusion), thermoforming, or molding, including injection molding, compression molding, gas assist molding, structural foam molding, and blow molding. In an embodiment, a method of forming an article comprises shaping, extruding, blow molding, or injection molding the composition to form the article. The isolated polyetherimide composition can also be formed into articles using thermoplastic processes such as film and sheet extrusion, for example melt casting, blown film extrusion, and calendaring. Co-extrusion and lamination processes can be used to form composite multi-layer films or sheets.

Because the isolated polyetherimide composition has improved melt stability, it is useful in many applications, particularly applications that benefit from a high gloss finish. Examples of applications include food service, medical, lighting, lenses, sight glasses, windows, enclosures, safety shields, and the like. Examples of other articles include, but are not limited to, cookware, medical devices, trays, plates, handles, helmets, animal cages, electrical connectors, enclosures for electrical equipment, engine parts, automotive engine parts, lighting sockets and reflectors, electric motor parts, power distribution equipment, communication equipment, computers and the like, including devices that have molded in snap fit connectors. The isolated polyetherimide composition can also be made into films and sheets as well as components of laminate systems. Other articles include, for example, fibers, multilayer sheets, multilayer films, molded parts, extruded profiles, coated parts and foams: windows, luggage racks, wall panels, chair parts, lighting panels, diffusers, shades, partitions, lenses, skylights, lighting devices, reflectors, ductwork, cable trays, conduits, pipes, cable ties, wire coatings, electrical connectors, air handling devices, ventilators, louvers, insulation, bins, storage containers, doors, hinges, handles, sinks, mirror housing, mirrors, toilet seats, hangers, coat hooks, shelving, ladders, hand rails, steps, carts, trays, cookware, food service equipment, communications equipment, instrument panels, or the like.

The isolated polyetherimide composition can optionally include various additives ordinarily incorporated into polymer compositions of this type, with the proviso that the additive(s) are selected so as to not significantly adversely affect the desired properties of the isolated polyetherimide composition, in particular the light transmission at 800 nm. Such additives can be mixed at a suitable time during the mixing of the components for forming the composition. Additives include impact modifiers, fillers, reinforcing agents, antioxidants, heat stabilizers, light stabilizers, ultraviolet (UV) light stabilizers, plasticizers, lubricants, antistatic agents, colorants such as such as titanium dioxide, carbon black, and organic dyes, surface effect additives, radiation stabilizers, flame-retardants, and anti-drip agents. A combination of additives can be used, for example a combination of a heat stabilizer and ultraviolet light stabilizer. In general, the additives are used in the amounts generally known to be effective. For example, the total amount of the additives (other than any impact modifier, filler, or reinforcing agents) can be 0.01 to 5 wt %, based on the total weight of the isolated polyetherimide composition.

The polyetherimide compositions are further illustrated by the following non-limiting examples.

EXAMPLES

The following components are used in the examples. Unless specifically indicated otherwise, the amount of each component is in weight percent in the following examples, based on the total weight of the composition.

TABLE 1

| Component | Description | Supplier |
|---|---|---|
| BPADA | 2,2-Bis[4-(3,4-dicarboxyphenoxy)phenyl] propane dianhydride | SABIC |
| ClPA | 4-Chlorophthalic anhydride | SABIC |
| ClPAMI | 1,3-Bis(N-(4-chlorophthalimido))benzene | SABIC |
| GTS | Glycerol tristearate | EMERY |
| oDCB | o-Dichlorobenzene | AARTI/LANXESS |
| OligoPA | (structure shown) | SABIC |

Physical measurements were made using the tests and test methods described below. Unless indicated otherwise, all tests are the tests in effect in the year 2010. Injection molded test specimens were molded in accordance with ASTM test methods. Testing was performed in accordance with the methods in Table 2.

TABLE 2

| Property | Units | Method of measurement (conditions) |
|---|---|---|
| $M_w$ | g/mol | Gel permeation chromatography calibrated using polystyrene standards |
| $M_z$ | g/mol | Gel permeation chromatography calibrated using polystyrene standards |
| PDI | — | Gel permeation chromatography calibrated using polystyrene standards, calculated from the ratio of Mw to Mn |

TABLE 2-continued

| Property | Units | Method of measurement (conditions) |
|---|---|---|
| % cyclics | % | High pressure liquid chromatography |
| Residuals | ppm | High pressure liquid chromatography |
| MS-air | PaS | (390° C., air, 6.28 rad/seconds, strain = 5%, t = 0-300 sec) |
| MS-N$_2$ | PaS | (390° C., N$_2$, 6.28 rad/seconds, strain = 5%, t = 0-1800 sec) |
| Change MS-air | % | Calculated change in MS-air from t = 0 to t = 300 sec |
| Change MS-N$_2$ | % | Calculated change in MS-N$_2$ from t = 0 to t = 1800 sec |
| Yellowness index (YI) | | ASTM D1925-00 |
| T$_g$ | ° C. | Differential scanning calorimetry (DSC) |
| R* | — | Parallel Plate Rheometer |

R*: In the R* test, the temperature at which viscosity equals 2000 Pascal seconds (Pa · s) at 100 rad/s is first identified (T*), then, the viscosity at 1 rad/s for the same temperature is determined. The ratio between viscosity at 1 rad/s and 2000 Pa · s at T* is defined as R*. Test repeatability was verified with samples with R* ranging from 1.8 to 2.5, showing an average standard error of 0.01.

Anhydride Equivalents. The equivalent amount of anhydride addition to the examples, hereinafter "anhydride spikes" or "anhydride equivalents," is calculated using Equation 1, and is based on the formula weight of an anhydride unit (—C(=O)—O—C(=O)—)=72 g/mol) and the information in Table 3, which shows the formula weight of each additive and the number of moles of anhydride equivalents per molecule. It is assumed that since GTS contains 3 carboxyl groups (—COOH), it is equivalent to 3/2=1.5 moles of anhydride.

TABLE 3

| Additive (Anhydride Spike) | Formula Weight (g/mol) | Anhydride equivalents per molecule |
|---|---|---|
| BPADA | 520.5 | 2 |
| ClPA | 182.56 | 1 |
| OligoPA | 775.18 | 1 |
| GTS | 891.48 | 1.5 |

$$\text{Anhydride equivalents} = \left(\frac{\text{Weight of anhydride spike added}}{\text{Formula weight of anhydride spike}}\right) * (\text{Anhydride equivalents per molecule}) * (72) \quad \text{Eq. 1}$$

Sample Preparation

Processing of the polyetherimides (PEIs) was carried out in a laboratory scale helicone mixer (4CV Helicone mixer, Design Integrated Technology, Inc.). The helicone mixer was equipped with twin opposing helical blades with 270-degree twist, constructed of Alloy 2205 with 16 g polish finish. The blade speed can be varied from 1 to 65 revolutions per minute (rpm). The helical blades were driven by a 7.5 HP Constant Torque Inverter Duty Motor. The bowl is double intersecting cone-type equipped with electric bronze heaters. The interior of the mix chamber was constructed of 316 SST with 16 g polish finish. A nitrogen purge and a vacuum system were available to regulate the pressure of the helicone mixer from atmospheric pressure to full vacuum.

A PEI solution was obtained as a filtered and washed solution in o-DCB, and the concentration of PEI in the PEI solution was 10 wt %. A specified amount (see Table 4) of additive was dissolved in oDCB and added to the PEI solution to prepare the polymer/additive mixture. The mixture was added to a pre-heated (180° C.) helicone mixer in two separate charges. The first charge of the mixture was added to the helicone mixer and maintained at 180° C. for 200 minutes at atmospheric pressure to obtain an approximately 30 wt % concentration of PEI in the mixture. After 200 minutes, the second charge of the mixture was added to the helicone mixer and maintained at 180° C. for 200 minutes at atmospheric pressure to obtain an approximately 30 wt % concentration of PEI in the mixture. The mixture was then mixed for 120 minutes at atmospheric pressure, and during this time the temperature was increased to 350° C. The system pressure was reduced to below 1 Torr (0.133 kiloPascal) with the mixture being held at reduced pressure for 20 minutes, and during this time the temperature was increased to 370° C. The vacuum was then discharged and the mixture was forced through a die at the bottom of the mixer. Upon exiting the die, the molten mixture was cooled using ambient air and then chopped into pellets and dried at 150° C. for 4 hours.

The helicone isolation variables are shown in Table 4.

TABLE 4

| Property | Units | Description |
|---|---|---|
| Concentration time | minutes | Time from initial charge to when the temperature reaches 200° C. |
| Time from T > 200° C. to max torque | minutes | Time from the temperature reaches 200° C. to maximum torque |
| Time after max torque | minutes | Time from when the maximum torque is achieved to the end of the run |
| Time from T > 200° C. to end | minutes | Time from when mixture reaches 200° C. to end of run |
| T from T > 200° C. to max torque | ° C. | Average temperature from the time when the mixture achieves 200° C. and the time at which the maximum torque is achieved |
| T at max torque | ° C. | Temperature at the time the maximum torque is achieved |
| Avg T polymer after max torque | ° C. | Average temperature from the time when the mixture achieves maximum torque and the end of the run |
| T max | ° C. | Maximum temperature of the run |
| O$_2$ at T > 200° C. | ppm | Average O$_2$ measurement from the time when the mixture achieves 200° C. and the end of the run |
| Agitator speed | rpm | Agitator rotation speed |
| Max torque | N · m | Maximum torque |
| Final torque | N · m | Torque measured at the end of the run |

Examples 1-8

The PEI/additive mixtures and the processing conditions are shown in Table 5.

TABLE 5

|  | C* | 1 | 2 | 3 | 4 | 5 | 6 | 7* | 8* |
|---|---|---|---|---|---|---|---|---|---|
| Anhydride spike (ppm) | — | BPADA (192) | BPADA (385) | BPADA (769) | ClPA (1154) | ClPA (4038) | OligoPA (769) | GTS (2308) | GTS (4615) |
| Concentration time (min.) | 405 | 435 | 450 | 435 | 450 | 420 | 450 | 390 | 390 |
| Time from T >200° C. to max torque (min.) | 13 | 13 | 18 | 17 | 21 | 21 | 21 | 19 | 18 |
| Time after max torque (min.) | 110 | 95 | 100 | 105 | 92 | 97 | 92 | 93 | 94 |
| Time from T >200° C. to end (min.) | 123 | 108 | 118 | 122 | 113 | 118 | 113 | 112 | 112 |
| T from T >200° C. to max torque (° C.) | 236 | 265 | 220 | 256 | 227 | 248 | 225 | 244 | 248 |
| T at max torque (° C.) | 260 | 271 | 267 | 278 | 272 | 279 | 269 | 273 | 278 |
| Avg T polymer after max torque (° C.) | 358 | 360 | 345 | 346 | 343 | 366 | 341 | 345 | 367 |
| T max (° C.) | 369 | 370 | 372 | 370 | 370 | 370 | 370 | 371 | 371 |
| $O_2$ at T >200° C. (ppm) | 1 | 39 | 7 | — | — | — | — | 11 | — |
| Agitator speed (rpm) | 60 | 60 | 60 | 60 | 60 | 60 | 60 | 60 | 60 |
| Max torque (N · m) | 3.9 | 3.6 | 3.8 | 3.5 | 3.6 | 3.6 | 3.7 | 3.5 | 3.4 |
| Final torque (N · m) | 1.5 | 1.6 | 1.5 | 1.5 | 1.5 | 1.5 | 1.5 | 1.5 | 1.5 |

*Comparative example

The polyetherimide alone, without an additive, and the polyetherimide/additive mixtures were tested for a range of physical properties and chemical makeup according to the methods of Table 2. In particular, the melt stability of each mixture was evaluated by measuring the percent increase in viscosity at 390° C. for 30 minutes (in $N_2$). Results are shown in Table 6.

TABLE 6

|  | C* | 1 | 2 | 3 | 4 | 5 | 6 | 7 | 8 |
|---|---|---|---|---|---|---|---|---|---|
| Anhydride spike** (ppm) | — | BPADA (192) | BPADA (385) | BPADA (769) | ClPA (1,154) | ClPA (4,038) | OligoPA (769) | GTS (2,308) | GTS (4,615) |
| Anhydride spike equivalents‡ (ppm) | — | 53 | 106 | 213 | 455 | 1,593 | 71 | 80 | 560 |
| ClPAMI, Mw, and Molecular weight distribution | | | | | | | | | |
| ClPAMI stoich, % mol | 0.23 | 0.23 | 0.23 | 0.23 | 0.23 | 0.23 | 0.23 | 0.23 | 0.23 |
| $M_w$ (g/mol) | 44,381 | 44,711 | 43,524 | 43,951 | 43,240 | 43,120 | 43,891 | 44,098 | 43,673 |
| PDI | 2.74 | 2.82 | 2.73 | 2.78 | 2.73 | 2.78 | 2.75 | 2.73 | 2.72 |
| $M_z/M_w$ | 1.74 | 1.73 | 1.73 | 1.75 | 1.73 | 1.73 | 1.73 | 1.73 | 1.72 |
| % cyclics | 1.28 | 1.17 | 1.28 | 1.34 | 1.38 | 1.13 | 1.31 | 1.30 | 1.31 |
| Residuals | | | | | | | | | |
| BPA (ppm) | 0 | 5 | 1 | 2 | 2 | 0 | 3 | 1 | 5 |
| ClPAMI (ppm) | 46 | 29.1 | 28.8 | 32.8 | 32 | 28 | 32 | 13 | 29 |
| ClPA (ppm) | 0 | 0 | 0 | 0 | 0 | 0 | 0 | 0 | 0 |
| BPADA (ppm) | 3 | 57.6 | 101 | 212 | 10 | 9 | 12 | 4 | 6 |
| OligoPA (ppm) | 40 | 24 | 39 | 53 | 34 | 22 | 407 | 47 | 37 |
| Anhydride (ppm) | 5 | 18 | 32 | 64 | 6 | 4 | 41 | 6 | 5 |
| oDCB (ppm) | 40 | 24 | 12 | 23 | 20 | 38 | 3 | 7 | 4 |
| % Anhydride spike remaining** | — | 30 | 26 | 28 | 0 | 0 | 53 | — | — |
| YI and Rheometry | | | | | | | | | |
| YI (quench) | 83 | — | 83 | 83 | 83 | 83 | 83 | 83 | 83 |
| YI (pellets) | 108 | 106 | 109 | 109 | 104 | 107 | 106 | 125 | 133 |
| $T_g$ (° C.) | 216 | 216 | 216 | 216 | 216 | 216 | 216 | 216 | 216 |
| R* | 2.2 | 2.1 | 2.1 | 2.2 | 2.1 | 2.1 | 2.1 | 2.2 | 2.1 |
| Change in MS-$N_2$ (%) | 3.9 | −1.3 | −9.1 | −13.2 | −0.04 | −0.63 | −1.3 | −2.4 | −19.1 |
| Change in MS-air (%) | 3.7 | 2.4 | 2.0 | 2.6 | 2.7 | 4.0 | 2.7 | 2.3 | 1.4 |

*Comparative example
**Amount added to as-synthesized polyetherimide
‡Amount of anhydride equivalents in the anhydride spike, calculated using Eq. 1

Examples 1-3 are polyetherimide mixtures that were prepared with 192, 385, and 769 ppm of BPADA, respectively, and are labeled 200 ppm, 400 ppm, and 800 ppm BPADA, respectively, in FIG. 1.

Figure 2:
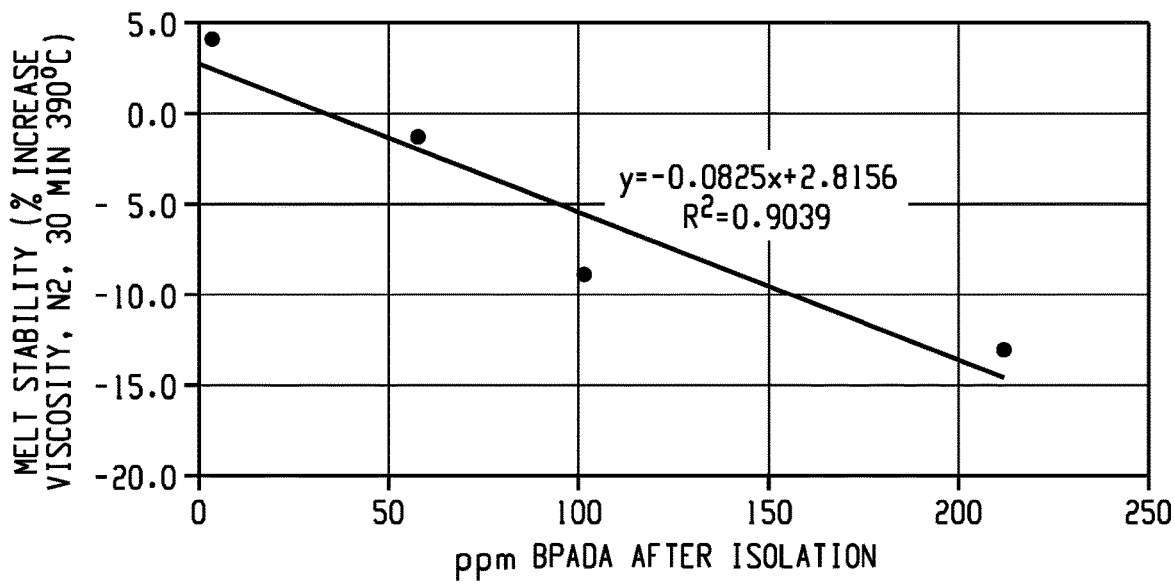
FIG. 2 is a graph of change in MS (percent increase in viscosity) versus BPADA concentration (ppm) according to an embodiment.

FIGS. 1 and 2 shows that combining BPADA with the polyetherimide before extrusion significantly affected the melt stability of the mixture. As seen in FIG. 2, the change in viscosity after 30 minutes varied linearly with the concentration of BPADA. The change in viscosity after 30 minutes also varied linearly with the amount of BPADA left in the mixture after isolation. The largest reduction in viscosity was observed for the mixture prepared using 769 ppm of BPADA (−13.2%). In contrast, the polyetherimide prepared without the additive had a melt stability increase of 3.9% under the same conditions. The molecular weight, R*, and yellowness index of the resulting mixture were unaffected by the addition of BPADA to the polyetherimide.

Figure 3:
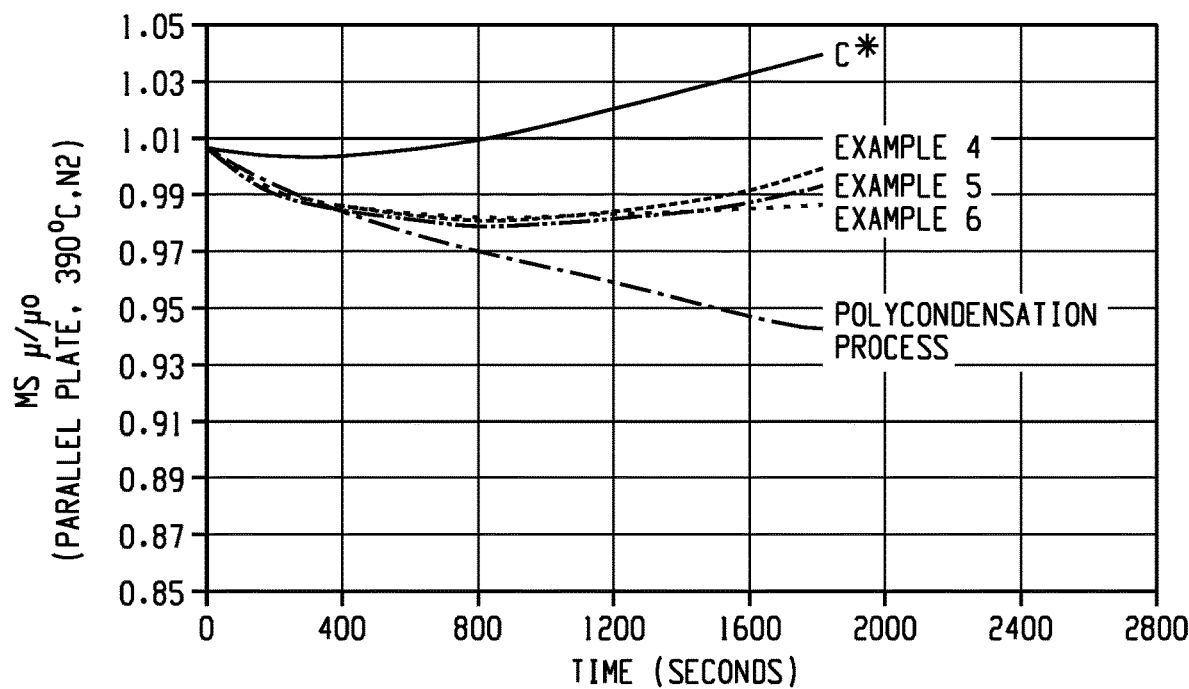
FIG. 3 is a graph of MS versus time (s) showing polycondensation-derived PEI, C*, Example 4 (light orange), Example 5 (dark orange) and Example 6 (brown).

Examples 4-5 are polyetherimide mixtures that were prepared with 1,154 and 4,038 ppm of ClPA, respectively, and are labeled 1200 ppm and 4000 ppm, respectively, in FIG. 3. Example 6 is a polyetherimide mixture that was prepared with 769 ppm of OligoPA, and is labeled 800 ppm in FIG. 3.

The effect of ClPA and OligoPA additives on the melt stability of the polymers was not as pronounced as the effect observed with BPADA. As shown in FIG. 3, addition of ClPA or OligoPA to the polyetherimide prior to isolation has a minor effect on the polymer melt stability. The viscosity after 30 min remains essentially constant, and the change in viscosity was 0 to −1% with ClPA and oligo PA additives after 30 minutes. Increasing the concentration of ClPA from 1,154 ppm to 4,038 ppm did not change the melt stability significantly. For Examples 4-5, there was no residual ClPA left over after isolation, which can explain the small effect of ClPA on melt stability. For Example 6, the OligoPA purity was approximately 90%, likely containing trace amine impurities. The presence of amines in the OligoPA additive may explain its limited effect on melt stability. The molecular weight, R*, and yellowness index of the mixtures were unaffected by the addition ClPA or OligoPA to the polyetherimide.

Examples 7-8 are polyetherimide mixtures that were prepared with 2,308 ppm (~0.2%) and 4,615 ppm (~0.5%) of GTS.

Figure 4:
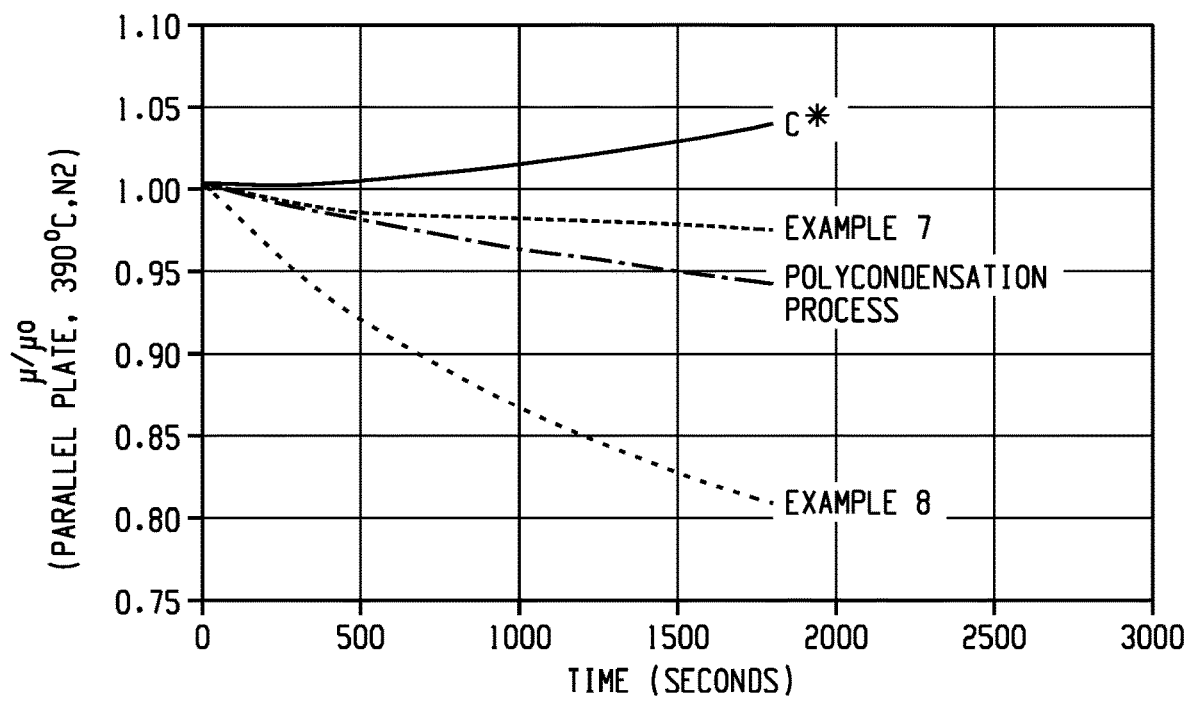
FIG. 4 is a graph of MS versus time (s) showing polycondensation-derived PEI, C*, Example 7, and Example 8.
Figure 5:
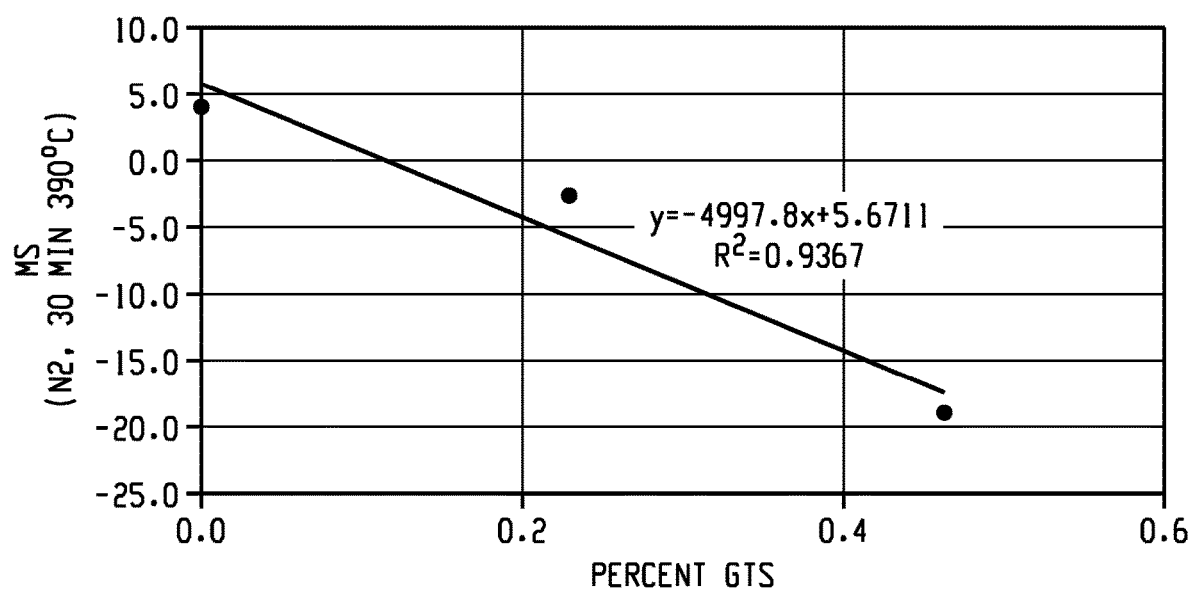
FIG. 5 is a graph of change in MS (percent increase in viscosity) versus GTS concentration (ppm) according to an embodiment.

As shown in FIGS. 4 and 5, addition of the GTS additive to the polyetherimide prior to isolation has a significant effect on the melt stability. The change in viscosity after 30 min varies linearly with the concentration of the GTS additive, showing a maximum viscosity reduction of 19.1% for the mixture including 4,615 ppm of GTS.

The various aspects of the invention are illustrated by the following Aspects, which are not intended to be limiting.

Aspect 1. A method of manufacturing an isolated polyetherimide composition includes combining an as-synthesized polyetherimide comprising units of the formula

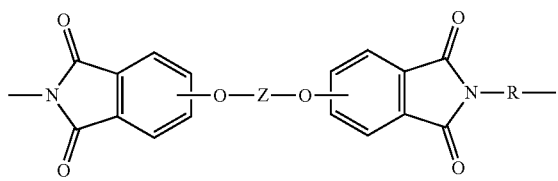

and a melt-stabilizing amount of a tri($C_{8-30}$ acyl) glyceride, an anhydride of the formula

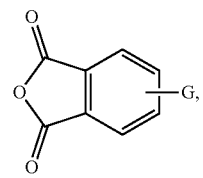

or a combination comprising at least one of the foregoing, wherein in the foregoing formulas, R is a substituted or unsubstituted $C_{6-30}$ aromatic hydrocarbon group, a substituted or unsubstituted, straight or branched chain $C_{4-30}$ alkylene group, a substituted or unsubstituted $C_{3-8}$ cycloalkylene group, or a combination comprising at least one of the foregoing; Z is an aromatic $C_{6-30}$ monocyclic or polycyclic group optionally substituted with 1 to 6 $C_{1-8}$ alkyl groups, 1 to 8 halogen atoms, or a combination comprising at least one of the foregoing, and G is a hydrogen atom, a halogen atom, a nitro group, $C_{1-12}$ alkyl, $C_{2-12}$ alkenyl, $C_{2-12}$ alkynyl, $C_{1-12}$ haloalkyl, $C_{1-12}$ alkoxy, $C_{1-12}$ haloalkoxy, $C_{3-12}$ cycloalkyl, $C_{5-12}$ cycloalkenyl, $C_{6-18}$ aryl, $C_{7-31}$ arylalkylene, $C_{7-31}$ alkylarylene, $C_{4-12}$ heterocycloalkyl, $C_{3-18}$ heteroaryl, $C_{1-12}$ alkyl sulfonyl, $C_{6-12}$ arylsulfonyl, tosyl, or a group of the formulas

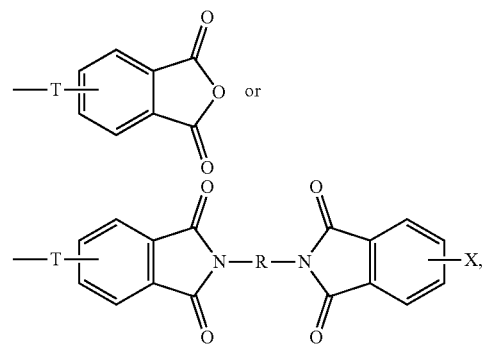

wherein T is —O—Z—O—, a single bond, —O—, —S—, —C(O)—, —$SO_2$—, —SO—, —P($R^a$)(=O)— wherein $R^a$ is $C_{1-8}$ alkyl or $C_{6-12}$ aryl, $NR^b$ wherein $R^b$ is a hydrogen atom, $C_{1-8}$ alkyl, or $C_{6-12}$ aryl, or T is a $C_{1-18}$ organic bridging group, and X is chloro, bromo, iodo, or nitro, or a combination comprising at least one of the foregoing, to provide a mixture; and isolating a polyetherimide composition from the mixture to provide the isolated polyetherimide composition having a change in complex viscosity measured over 30 minutes at 390° C., at a shear rate of 6.28 rad/seconds, strain=5%, and under nitrogen, from +15 to −20%, preferably from +10 to −20%, more preferably from +5 to −20%; and 0 to 3,000 ppm, preferably 0 to 1,000 ppm, more preferably 0 to 300 ppm, each based on a total weight of the isolated polyetherimide composition, of a dianhydride of the formula

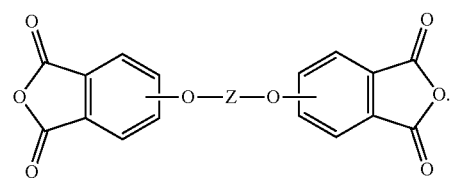

Aspect 2. The method of Aspect 1, wherein each R is independently a divalent group of the formulae (2) wherein $Q^1$ is —O—, —S—, —C(O)—, —SO$_2$—, —SO—, P($R^a$)(=O)— is wherein $R^a$ is a $C_{1-8}$ alkyl or $C_{6-12}$ aryl, —$C_yH_{2y}$— wherein y is an integer from 1 to 5 or a halogenated derivative thereof, or —$(C_6H_{10})_z$— wherein z is an integer from 1 to 4; and each Z is independently a group of the formula

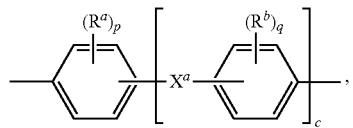

wherein $R^a$ and $R^b$ are each independently a halogen atom or a monovalent $C_{1-6}$ alkyl group; p and q are each independently integers from 0 to 4; c is an integer from 0 to 4; and $X^a$ is a single bond, —O—, —S—, —S(O)—, —SO$_2$— —C(O)—, or a $C_{1-18}$ organic bridging group.

Aspect 3. The method of Aspect 2, wherein each R is independently meta-phenylene, para-phenylene, bis(4,4'-phenylene)sulfone, bis(3,4'-phenylene)sulfone, bis(3,3'-phenylene) sulfone, or a combination comprising at least one of the foregoing, and each Z is 4,4'-diphenylene isopropylidene.

Aspect 4. The method of any one or more of Aspects 1 to 3, wherein the melt-stabilizing amount of the tri($C_{8-30}$ acyl) glyceride, the anhydride, or the combination comprising at least one of the foregoing is 10 to 2,600 ppm of anhydride equivalents, or 50 to 1,600 ppm of anhydride equivalents, or 50 to 600 ppm of anhydride equivalents, each based on the total weight of the as-synthesized polyetherimide.

Aspect 5. The method of any one or more of Aspects 1 to 4 comprising the anhydride, wherein the tri($C_{8-30}$ acyl) glyceride is of the formula

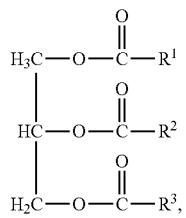

wherein each $R^1$, $R^2$, and $R^3$ is independently a substituted or unsubstituted $C_{8-30}$ alkyl group optionally having 0 to 6 unsaturations.

Aspect 6. The method of Aspect 5, wherein each $R^1$, $R^2$, and $R^3$ is independently a $C_{8-30}$ alkyl group having 0 to 2 unsaturations and optionally substituted with one or more halogens.

Aspect 7. The method of Aspect 6, wherein the tri($C_{8-30}$ acyl) glyceride comprises glycerol tristearate.

Aspect 8. The method of any one or more of Aspects 1 to 7, comprising the anhydride wherein G is a group of the formula

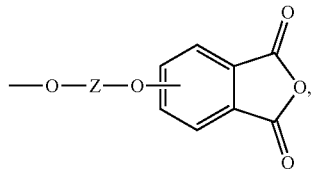

optionally wherein Z in the group G is not the same as Z in the as-synthesized polyetherimide.

Aspect 9. The method of one or more of Aspects 1 to 8, wherein G is a group of the formula

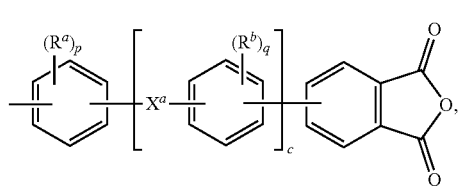

wherein $R^a$ and $R^b$ are each independently the same or different, and are a halogen atom or a monovalent $C_{1-6}$ alkyl group; p and q are each independently integers of 0 to 4; c is 0 to 4; and $X^a$ is a $C_{1-18}$ bridging group; and optionally wherein Z in the group G is not the same as Z in the as-synthesized polyetherimide.

Aspect 10. The method of any one or more of Aspects 1 to 9, comprising the anhydride, wherein the anhydride is of the formula

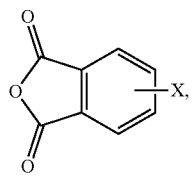

wherein X is a hydrogen atom, halogen atom, or a nitro group, preferably wherein the anhydride is of the formula

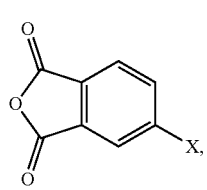

wherein X is a chlorine atom or a nitro group.

Aspect 11. The method of any one or more of Aspects 1 to 10, comprising the anhydride, wherein the anhydride is of the formula

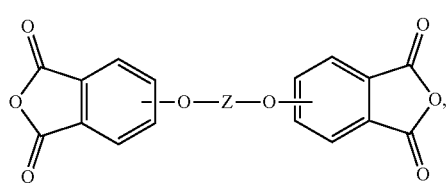

wherein Z in the anhydride is the same as Z in the as-synthesized polyetherimide; or the anhydride is of the formula

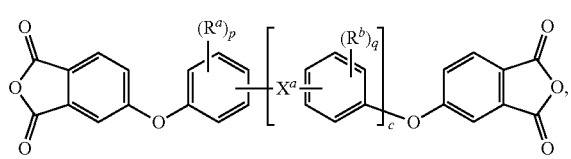

wherein $R^a$ and $R^b$ are each independently the same or different, and are a halogen atom or a monovalent $C_{1-6}$ alkyl group; p and q are each independently integers of 0 to 4; c is 0 to 4; $X^a$ is a $C_{1-18}$ bridging group; and $R^a$, $R^b$, p, q, c, and $X^a$ in the anhydride are the same as Z in the as-synthesized polyetherimide; or the anhydride is of the formula

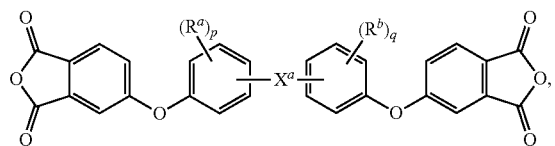

wherein $R^a$ and $R^b$ are each independently the same or different, and are a halogen atom or a monovalent $C_{1-6}$ alkyl group; p and q are each independently integers of 0 to 4; c is 0 to 4; $X^a$ is a $C_{1-18}$ bridging group; and $R^a$, $R^b$, p, q, and $X^a$, in the anhydride are the same as Z in the as-synthesized polyetherimide; or the anhydride is of the formula

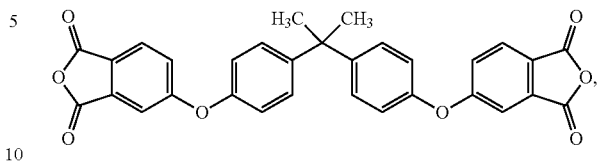

when Z is derived from bisphenol A in the as-synthesized polyetherimide.

Aspect 12. The method of any one or more of Aspects 1 to 11, comprising the anhydride, wherein the anhydride is of the formula

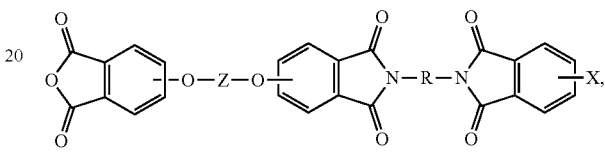

wherein Z and R are the same as in the as-synthesized polyetherimide, and X is a hydrogen atom, halogen atom, or a nitro group.

Aspect 13. The method of any one or more of Aspects 1 to 12 comprising the anhydride, wherein R in the as-synthesized polyetherimide is derived from meta-phenylene, and the anhydride is of the formula

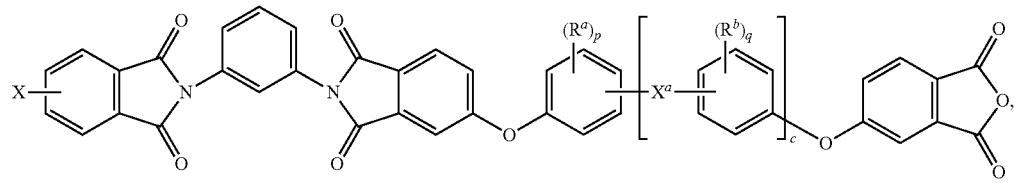

wherein $R^a$ and $R^b$ are each independently the same or different, and are a halogen atom or a monovalent $C_{1-6}$ alkyl group; p and q are each independently integers of 0 to 4; c is 0 to 4; $X^a$ is a $C_{1-18}$ bridging group; and X is a hydrogen atom, halogen atom, or a nitro; and $R^a$, $R^b$, p, q, c, and $X^a$ are the same as Z in the as-synthesized polyetherimide; or the anhydride is of the formula

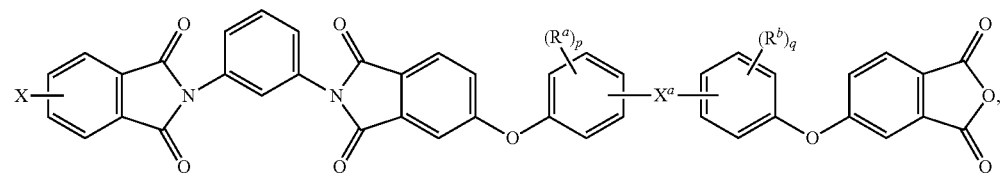

wherein $R^a$ and $R^b$ are each independently the same or different, and are a halogen atom or a monovalent $C_{1-6}$ alkyl group; p and q are each independently integers of 0 to 4; c is 0 to 4; $X^a$ is a $C_{1-18}$ bridging group; and X is a hydrogen atom, halogen atom, or a nitro; and $R^a$, $R^b$, p, q, and $X^a$ are the same as Z in the as-synthesized polyetherimide; or the anhydride is of the formula

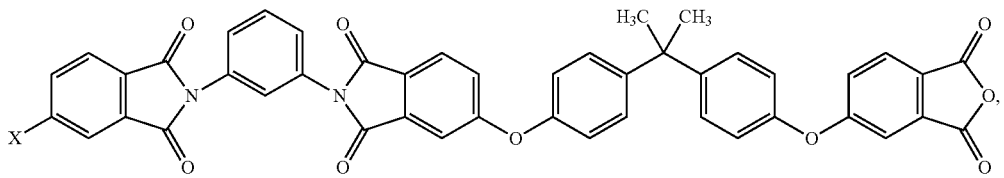

wherein Z is derived from bisphenol A in the as-synthesized polyetherimide, and X is a hydrogen atom, halogen atom, or a nitro group.

Aspect 14. The method of any one or more of Aspects 1 to 13, wherein the isolated polyetherimide composition comprises a dianhydride of the formula

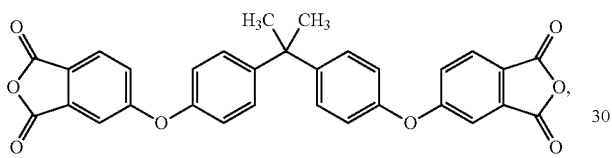

in an amount of 0 to 3,000 ppm, 0 to 1,000 ppm, or 0 to 300 ppm; or up to 3,000 ppm, up to 1,000 ppm, or up to 300 ppm.

Aspect 15. The method of any one or more of Aspects 1 to 14, wherein the isolated polyetherimide composition comprises up to 5,000 ppm, up to 1,000 ppm, or up to 100 ppm of a bis(phthalimide) of the formula

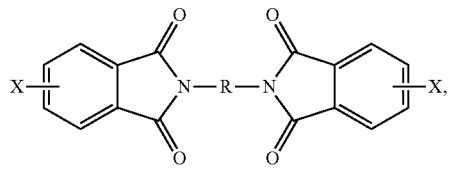

preferably wherein X is chloro and R is 2,4-phenylene.

Aspect 16. The method of any one or more of Aspects 1 to 15, wherein the isolated polyetherimide composition has at least one of a Yellowness Index of less than 150, preferably less than 140, as determined in accordance with ASTM D1925-00 on a molded sample having a thickness of 3.2 millimeters; and a weight average molecular weight of 30,000 to 75,000 grams per mole, preferably 35,000 to 56,000 grams per mole, more preferably 40,000 to 56,000 grams per mole.

Aspect 17. The method of any one or more of Aspects 1 to 16, wherein isolating comprises melt extruding the mixture at 150 to 420° C., preferably at 180 to 400° C., more preferably at 180 to 370° C.

Aspect 18. An isolated polyetherimide composition comprising a polyetherimide comprising units of the formula

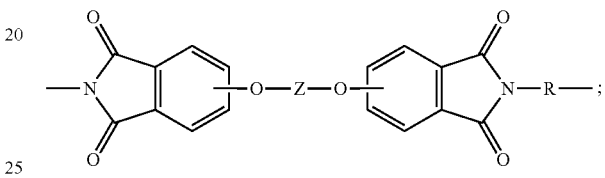

and (a) a tri($C_{8-30}$ acyl) glyceride, an anhydride of the formula

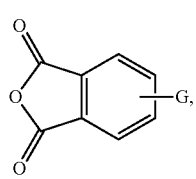

or a combination comprising at least one of the foregoing, or (b) a residue of the tri($C_{8-30}$ acyl) glyceride, the anhydride, or a combination comprising at least one of the foregoing, or (c) a combination comprising (a) and (b); wherein in the foregoing formulas, R is a substituted or unsubstituted $C_{6-30}$ aromatic hydrocarbon group, a substituted or unsubstituted, straight or branched chain $C_{4-30}$ alkylene group, a substituted or unsubstituted $C_{3-8}$ cycloalkylene group, or a combination comprising at least one of the foregoing; Z is an aromatic $C_{6-30}$ monocyclic or polycyclic group optionally substituted with 1 to 6 $C_{1-8}$ alkyl groups, 1 to 8 halogen atoms, or a combination comprising at least one of the foregoing, and G is a hydrogen atom, a halogen atom, a nitro group, $C_{1-12}$ alkyl, $C_{2-12}$ alkenyl, $C_{2-12}$ alkynyl, $C_{1-12}$ haloalkyl, $C_{1-12}$ alkoxy, $C_{1-12}$ haloalkoxy, $C_{3-12}$ cycloalkyl, $C_{5-12}$ cycloalkenyl, $C_{6-18}$ aryl, $C_{7-31}$ arylalkylene, $C_{7-31}$ alkylarylene, $C_{4-12}$ heterocycloalkyl, $C_{3-18}$ heteroaryl, $C_{1-12}$ alkyl sulfonyl, $C_{6-12}$ arylsulfonyl, tosyl, or a group of the formulas

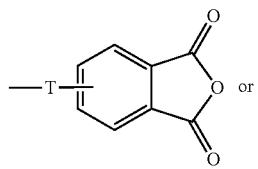

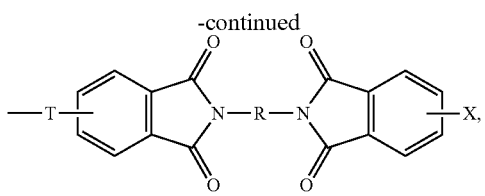

wherein T is —O—, a single bond, —O—, —S—, —C(O)—, —SO$_2$—, —SO—, —P(R$^a$)(=O)— wherein R$^a$ is C$_{1-8}$ alkyl or C$_{6-12}$ aryl, NR$^b$ wherein R$^b$ is a hydrogen atom, C$_{1-8}$ alkyl, or C$_{6-12}$ aryl, or T is a C$_{1-18}$ organic bridging group, and X is chloro, bromo, iodo, or nitro, or a combination comprising at least one of the foregoing.

Aspect 19. The isolated polyetherimide composition of Aspect 18, wherein the groups R and Z in the polyetherimide are not the same as any groups R and Z in the anhydride, or a residue thereof.

Aspect 20. An article comprising the isolated polyetherimide composition made by the method of any one or more of Aspects 1 to 17, or the isolated polyetherimide composition of any one or more of Aspects 18 to 19, preferably an injection molded article.

The compositions, methods, and articles can alternatively comprise, consist of, or consist essentially of, any appropriate components or steps herein disclosed. The compositions, methods, and articles can additionally, or alternatively, be formulated so as to be devoid, or substantially free, of any steps, components, materials, ingredients, adjuvants, or species that are otherwise not necessary to the achievement of the function or objectives of the compositions, methods, and articles.

All ranges disclosed herein are inclusive of the endpoints, and the endpoints are independently combinable with each other. "Combinations" is inclusive of blends, mixtures, alloys, reaction products, and the like. The terms "first," "second," and the like, do not denote any order, quantity, or importance, but rather are used to distinguish one element from another. The terms "a" and "an" and "the" do not denote a limitation of quantity, and are to be construed to cover both the singular and the plural, unless otherwise indicated herein or clearly contradicted by context. "Or" means "and/or" unless clearly stated otherwise. It is to be understood that the described elements may be combined in any suitable manner in the various embodiments.

Unless defined otherwise, technical and scientific terms used herein have the same meaning as is commonly understood by one of skill in the art to which this application belongs. All cited patents, patent applications, and other references are incorporated herein by reference in their entirety. However, if a term in the present application contradicts or conflicts with a term in the incorporated reference, the term from the present application takes precedence over the conflicting term from the incorporated reference.

As used herein, the term "hydrocarbyl" includes groups containing carbon, hydrogen, and optionally one or more heteroatoms (e.g., 1, 2, 3, or 4 atoms such as halogen, O, N, S, P, or Si). "Alkyl" means a branched or straight chain, saturated, monovalent hydrocarbon group, e.g., methyl, ethyl, i-propyl, and n-butyl. "Alkylene" means a straight or branched chain, saturated, divalent hydrocarbon group (e.g., methylene (—CH$_2$—) or propylene (—(CH$_2$)$_3$—)). "Alkenyl" and "alkenylene" mean a monovalent or divalent, respectively, straight or branched chain hydrocarbon group having at least one carbon-carbon double bond (e.g., ethenyl (—HC=CH$_2$) or propenylene (—HC(CH$_3$)=CH$_2$—). "Alkynyl" means a straight or branched chain, monovalent hydrocarbon group having at least one carbon-carbon triple bond (e.g., ethynyl). "Alkoxy" means an alkyl group linked via an oxygen (i.e., alkyl-O—), for example methoxy, ethoxy, and sec-butyloxy. "Cycloalkyl" and "cycloalkylene" mean a monovalent and divalent cyclic hydrocarbon group, respectively, of the formula —C$_n$H$_{2n-x}$ and —C$_n$H$_{2n-2x}$—, respectively, wherein x is the number of cyclization(s). "Aryl" means a monovalent, monocyclic or polycyclic aromatic group (e.g., phenyl or naphthyl). "Arylene" means a divalent, monocyclic or polycyclic aromatic group (e.g., phenylene or naphthylene). "Arylene" means a divalent aryl group. "Alkylarylene" means an arylene group substituted with an alkyl group. "Arylalkylene" means an alkylene group substituted with an aryl group (e.g., benzyl). The prefix "halo" means a group or compound including one more halogen (F, Cl, Br, or I) substituents, which can be the same or different. The prefix "hetero" means a group or compound that includes at least one ring member that is a heteroatom (e.g., 1, 2, or 3 heteroatoms, wherein each heteroatom is independently N, O, S, or P.

Unless indicate otherwise, any group herein can be unsubstituted or substituted. "Substituted" means that the compound or group is substituted with at least one (e.g., 1, 2, 3, or 4) substituents instead of hydrogen, where each substituent is independently nitro (—NO$_2$), cyano (—CN), hydroxy (—OH), halogen, thiol (—SH), C$_{1-6}$ alkyl, C$_{2-6}$ alkenyl, C$_{2-6}$ alkynyl, C$_{1-6}$ haloalkyl, C$_{1-9}$ alkoxy, C$_{1-6}$ haloalkoxy, C$_{3-12}$ cycloalkyl, C$_{5-18}$ cycloalkenyl, C$_{6-12}$ aryl, C$_{7-13}$ arylalkylene (e.g., benzyl), C$_{7-12}$ alkylarylene (e.g., toluyl), C$_{4-12}$ heterocycloalkyl, C$_{3-12}$ heteroaryl, C$_{1-6}$ alkyl sulfonyl (—S(=O)$_2$-alkyl), C$_{6-12}$ arylsulfonyl (—S(=O)$_2$-aryl), or tosyl (CH$_3$C$_6$H$_4$SO$_2$—), provided that the substituted atom's normal valence is not exceeded, and that the substitution does not significantly adversely affect the manufacture, stability, or desired property of the compound. When a compound is substituted, the indicated number of carbon atoms is the total number of carbon atoms in the group, including those of the substituent(s).

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications, variations, improvements, and substantial equivalents.

What is claimed is:

1. A method of manufacturing an isolated polyetherimide composition, the method comprising
combining an as-synthesized polyetherimide comprising units of the formula

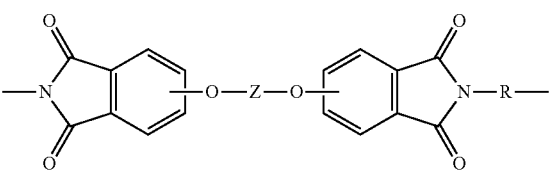

and a melt-stabilizing amount of
a tri(C$_{8-30}$ acyl) glyceride,
an anhydride of the formula

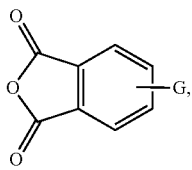

or a combination thereof, wherein the melt stabilizing amount is 10 to 2,600 parts per million of anhydride equivalents, based on the total weight of the as-synthesized polyetherimide, wherein in the foregoing formulas, R is a substituted or unsubstituted $C_{6-30}$ aromatic hydrocarbon group, a substituted or unsubstituted, straight or branched chain $C_{4-30}$ alkylene group, a substituted or unsubstituted $C_{3-8}$ cycloalkylene group, or a combination thereof;

Z is an aromatic $C_{6-30}$ monocyclic or polycyclic group optionally substituted with 1 to 6 $C_{1-8}$ alkyl groups, 1 to 8 halogen atoms, or a combination thereof, and G is a hydrogen atom, a halogen atom, a nitro group, $C_{1-12}$ alkyl, $C_{2-12}$ alkenyl, $C_{2-12}$ alkynyl, $C_{1-12}$ haloalkyl, $C_{1-12}$ alkoxy, $C_{1-12}$ haloalkoxy, $C_{3-12}$ cycloalkyl, $C_{5-12}$ cycloalkenyl, $C_{6-18}$ aryl, $C_{7-31}$ arylalkylene, $C_{7-31}$ alkylarylene, $C_{4-12}$ heterocycloalkyl, $C_{3-18}$ heteroaryl, $C_{1-12}$ alkyl sulfonyl, $C_{6-12}$ arylsulfonyl, tosyl, or a group of the formulas

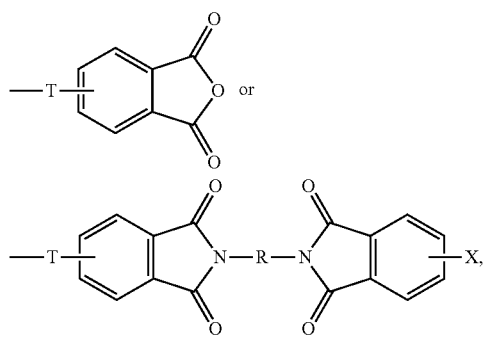

wherein

T is —O—Z—O—, a single bond, —O—, —S—, —C(O)—, —SO$_2$—, —SO—, —P(R$^a$)(=O)— wherein R$^a$ is $C_{1-8}$ alkyl or $C_{6-12}$ aryl, NR$^b$ wherein R$^b$ is a hydrogen atom, $C_{1-8}$ alkyl, or $C_{6-12}$ aryl, or T is a $C_{1-18}$ organic bridging group, and X is chloro, bromo, iodo, or nitro, or a combination thereof, to provide a mixture; and melt extruding the mixture to provide the isolated polyetherimide composition having a change in complex viscosity measured over 30 minutes at 390° C., at a shear rate of 6.28 rad/seconds, strain=5%, and under nitrogen, from +15 to −20%; and 0 to 3,000 parts per million, based on a total weight of the isolated polyetherimide composition, of a dianhydride of the formula

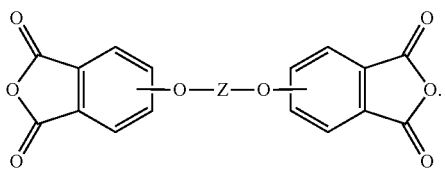

2. The method of claim 1, wherein each R is independently a divalent group of the formulae

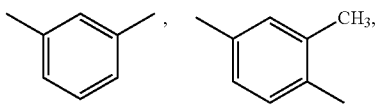

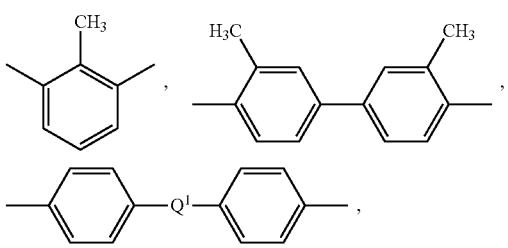

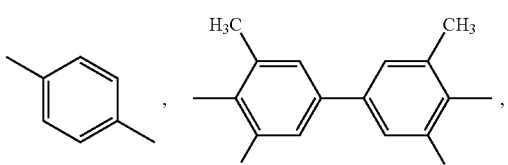

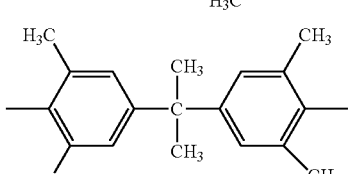

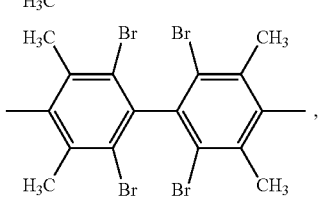

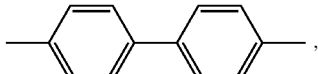

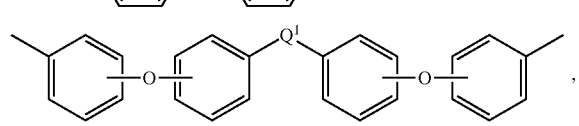

wherein Q$^1$ is —O—, —S—, —C(O)—, —S(O)$_2$—, —S(O)—, —P(R$^e$)(=O)— wherein R$^e$ is a $C_{1-8}$ alkyl or $C_{6-12}$ aryl, —C$_y$H$_{2y}$— wherein y is an integer from 1 to 5 or a halogenated derivative thereof, or —(C$_6$H$_{10}$)$_z$— wherein z is an integer from 1 to 4; and each Z is independently a group of the formula

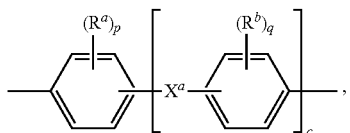

wherein
R$^a$ and R$^b$ are each independently a halogen atom or a monovalent C$_{1-6}$ alkyl group;
p and q are each independently integers from 0 to 4;
c is an integer from 0 to 4; and
X$^a$ is a single bond, —O—, —S—, —S(O)—, —S(O)$_2$—, —C(O)—, or a C$_{1-18}$ organic bridging group.

3. The method of claim 1, wherein the melt-stabilizing amount of the tri(C$_{8-30}$ acyl) glyceride, the anhydride, or the combination thereof is 10 to 1,600 parts per million of anhydride equivalents, based on the total weight of the as-synthesized polyetherimide.

4. The method of claim 1, comprising the tri(C$_{8-30}$ acyl) glyceride, wherein the tri(C$_{8-30}$ acyl) glyceride is of the formula

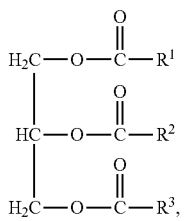

wherein each R$^1$, R$^2$, and R$^3$ is independently a substituted or unsubstituted C$_{8-30}$ alkyl group, optionally having 0 to 6 unsaturations.

5. The method of claim 4, wherein each R$^1$, R$^2$, and R$^3$ is independently a C$_{8-30}$ alkyl group having 0 to 2 unsaturations and optionally substituted with one or more halogens.

6. The method of claim 5, wherein the tri(C$_{8-30}$ acyl) glyceride comprises glycerol tristearate.

7. The method of claim 1, comprising the anhydride, wherein G is a group of the formula

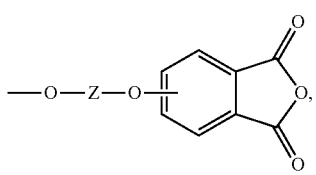

optionally wherein Z in the group G is not the same as Z in the as-synthesized polyetherimide.

8. The method of claim 1, wherein G is a group of the formula

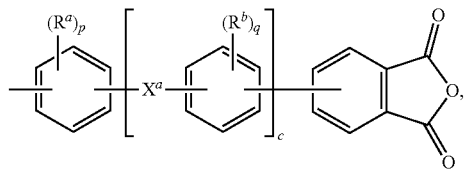

wherein R$^a$ and R$^b$ are each independently the same or different, and are a halogen atom or a monovalent C$_{1-6}$ alkyl group; p and q are each independently integers of 0 to 4; c is 0 to 4; and X$^a$ is a C$_{1-18}$ bridging group; and
optionally wherein Z in the group G is not the same as Z in the as-synthesized polyetherimide.

9. The method of claim 1, comprising the anhydride, wherein the anhydride is of the formula

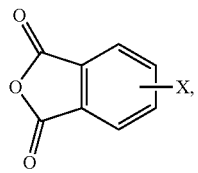

wherein X is a hydrogen atom, halogen atom, or a nitro group.

10. The method of claim 1, comprising the anhydride, wherein the anhydride is of the formula

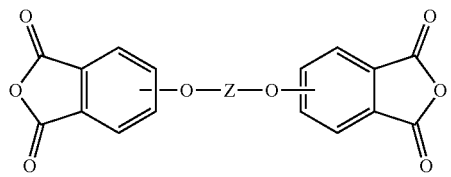

wherein Z in the anhydride is the same as Z in the as-synthesized polyetherimide; or
the anhydride is of the formula

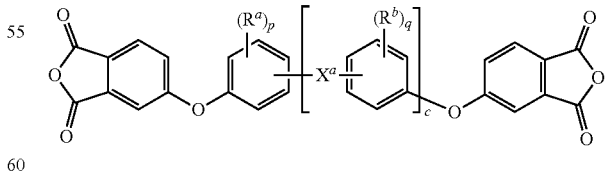

wherein R$^a$ and R$^b$ are each independently the same or different, and are a halogen atom or a monovalent C$_{1-6}$ alkyl group; p and q are each independently integers of 0 to 4; c is 0 to 4; X$^a$ is a C$_{1-18}$ bridging group; and R$^a$, R$^b$, p, q, c, and X$^a$ in the anhydride are the same as Z in the as-synthesized polyetherimide; or the anhydride is of the formula

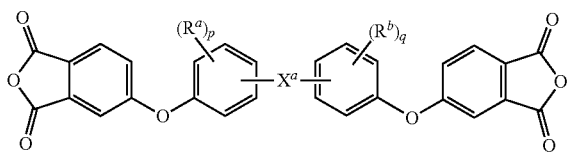

wherein $R^a$ and $R^b$ are each independently the same or different, and are a halogen atom or a monovalent $C_{1-6}$ alkyl group; p and q are each independently integers of 0 to 4; c is 0 to 4; $X^a$ is a $C_{1-18}$ bridging group; and $R^a$, $R^b$, p, q, and $X^a$ in the anhydride are the same as Z in the as-synthesized polyetherimide; or the anhydride is of the formula

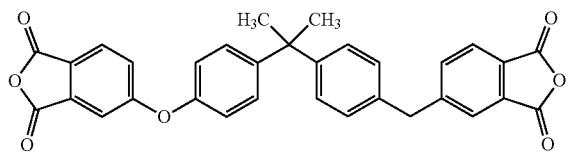 [SMILES: CC(C)(c1ccc(Cc2ccc3c(c2)C(=O)OC3=O)cc1)c1ccc(Oc2ccc3c(c2)C(=O)OC3=O)cc1]

when Z is derived from bisphenol A in the as-synthesized polyetherimide.

11. The method of claim 1, comprising the anhydride, wherein the anhydride is of the formula

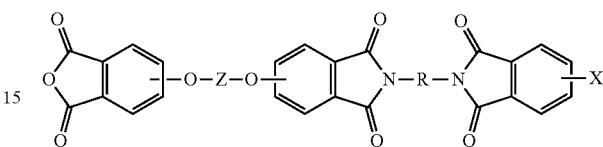

wherein Z and R are the same as in the as-synthesized polyetherimide, and X is a hydrogen atom, halogen atom, or a nitro group.

12. The method of claim 1, comprising the anhydride, wherein R in the as-synthesized polyetherimide is derived from meta-phenylene, and the anhydride is of the formula

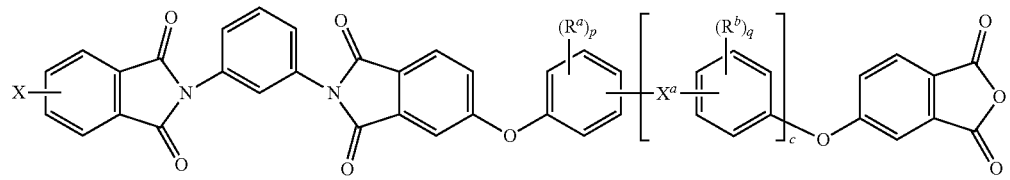

wherein $R^a$ and $R^b$ are each independently the same or different, and are a halogen atom or a monovalent $C_{1-6}$ alkyl group; p and q are each independently integers of 0 to 4; c is 0 to 4; $X^a$ is a $C_{1-18}$ bridging group; and X is a hydrogen atom, halogen atom, or a nitro; and $R^a$, $R^b$, p, q, c, and $X^a$ are the same as Z in the as-synthesized polyetherimide; or the anhydride is of the formula

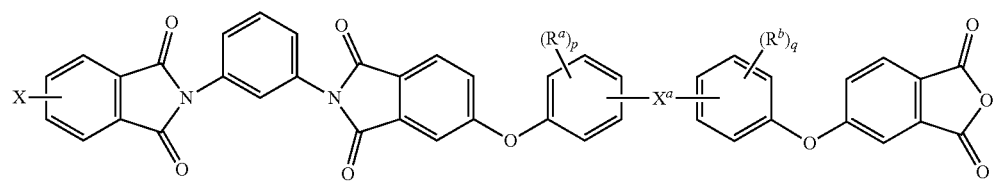

wherein $R^a$ and $R^b$ are each independently the same or different, and are a halogen atom or a monovalent $C_{1-6}$ alkyl group; p and q are each independently integers of 0 to 4; c is 0 to 4; $X^a$ is a $C_{1-18}$ bridging group; and X is a hydrogen atom, halogen atom, or a nitro; and $R^a$, $R^b$, p, q, and $X^a$ are the same as Z in the as-synthesized polyetherimide; or the anhydride is of the formula

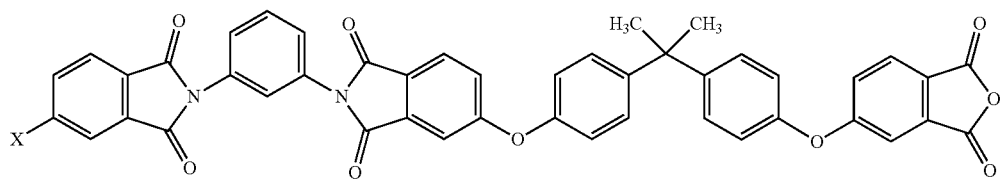

wherein Z is derived from bisphenol A in the as-synthesized polyetherimide, and X is a hydrogen atom, halogen atom, or a nitro group.

13. The method of claim 1, wherein the isolated polyetherimide composition comprises a dianhydride of the formula

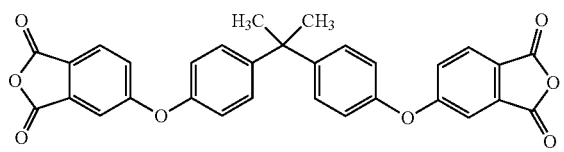 [SMILES: CC(C)(c1ccc(Oc2ccc3c(c2)C(=O)OC3=O)cc1)c1ccc(Oc2ccc3c(c2)C(=O)OC3=O)cc1]

in an amount of 0 to 3,000 parts per million.

14. The method of claim 1, wherein the isolated polyetherimide composition further comprises up to 5,000 parts per million of a bis(phthalimide) of the formula

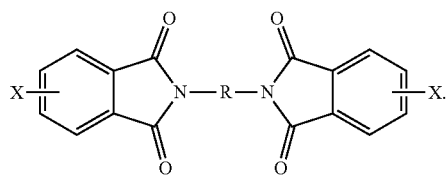

15. The method of claim 1, wherein the isolated polyetherimide composition has
a Yellowness Index of less than 150, as determined in accordance with ASTM D1925-00 on a molded sample having a thickness of 3.2 millimeters.

16. The method of claim 1, wherein the melt extruding is at 150 to 420° C.

17. An isolated polyetherimide composition made by the method of claim 1, comprising
a polyetherimide comprising units of the formula

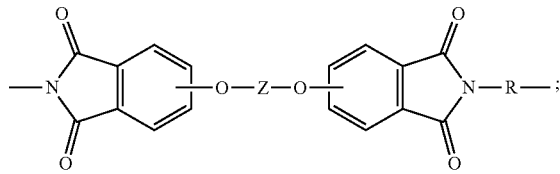

and
(a) a tri($C_{8-30}$ acyl) glyceride, an anhydride of the formula

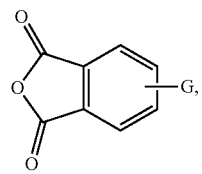

or a combination thereof, or
(b) a residual component from the manufacture of the as-synthesized polyetherimide, or
(c) a combination comprising (a) and (b);
wherein, in the foregoing formulas,
each R is independently a substituted or unsubstituted $C_{6-30}$ aromatic hydrocarbon group, a substituted or unsubstituted, straight or branched chain $C_{4-30}$ alkylene group, a substituted or unsubstituted $C_{3-8}$ cycloalkylene group, or a combination thereof;
each Z is independently an aromatic $C_{6-30}$ monocyclic or polycyclic group optionally substituted with 1 to 6 $C_{1-8}$ alkyl groups, 1 to 8 halogen atoms, or a combination thereof, and
G is a hydrogen atom, a halogen atom, a nitro group, $C_{1-12}$ alkyl, $C_{2-12}$ alkenyl, $C_{2-12}$ alkynyl, $C_{1-12}$ haloalkyl, $C_{1-12}$ alkoxy, $C_{1-12}$ haloalkoxy, $C_{3-12}$ cycloalkyl, $C_{5-12}$ cycloalkenyl, $C_{6-18}$ aryl, $C_{7-31}$ arylalkylene, $C_{7-31}$ alkylarylene, $C_{4-12}$ heterocycloalkyl, $C_{3-18}$ heteroaryl, $C_{1-12}$ alkyl sulfonyl, $C_{6-12}$ arylsulfonyl, tosyl, or a group of the formulas

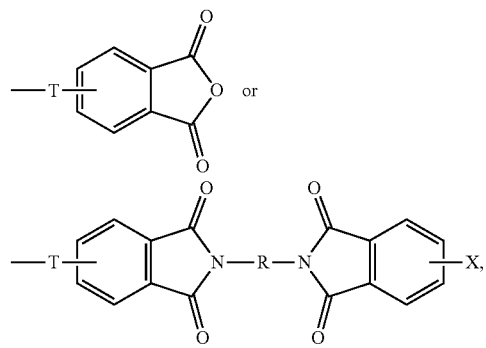

wherein

T is —O—Z—O—, a single bond, —O—, —S—, —C(O)—, —SO$_2$—, —SO—, —P(R$^a$)(=O)— wherein R$^a$ is C$_{1-8}$ alkyl or C$_{6-12}$ aryl, NR$^b$ wherein R$^b$ is a hydrogen atom, C$_{1-8}$ alkyl, or C$_{6-12}$ aryl, or T is a C$_{1-18}$ organic bridging group, and X is chloro, bromo, iodo, or nitro, or a combination thereof.

18. The isolated polyetherimide composition of claim 17, wherein the groups R and Z in the polyetherimide are not the same as any groups R and Z in the anhydride.

19. An article comprising the isolated polyetherimide composition made by the method of claim 1.

20. The isolated polyetherimide composition of claim 17, wherein the change in complex viscosity is from 0 to −20%, measured over 30 minutes at 390° C., at a shear rate of 6.28 rad/seconds, strain=5%, and under nitrogen.

* * * * *